(12) United States Patent
Göke et al.

(10) Patent No.: US 11,659,826 B2
(45) Date of Patent: May 30, 2023

(54) DETECTION OF ARTHROPODS

(71) Applicant: Bayer Aktiengesellschaft, Leverkusen (DE)

(72) Inventors: Dennis Göke, Cologne (DE); Robert Wollenhaupt, Langenfeld (DE); Matthias Tempel, Cologne (DE)

(73) Assignee: Bayer Aktiengesellschaft, Leverkusen (DE)

( * ) Notice: Subject to any disclaimer, the term of this patent is extended or adjusted under 35 U.S.C. 154(b) by 122 days.

(21) Appl. No.: 17/278,219

(22) PCT Filed: Sep. 16, 2019

(86) PCT No.: PCT/EP2019/074672
§ 371 (c)(1),
(2) Date: Mar. 19, 2021

(87) PCT Pub. No.: WO2020/058175
PCT Pub. Date: Mar. 26, 2020

(65) Prior Publication Data
US 2021/0378225 A1 Dec. 9, 2021

(30) Foreign Application Priority Data

Sep. 21, 2018 (EP) .................... 18195871
Apr. 30, 2019 (EP) .................... 19171993

(51) Int. Cl.
*A01M 1/02* (2006.01)
*A01M 1/10* (2006.01)
*H04N 7/18* (2006.01)
*G06V 20/52* (2022.01)
(Continued)

(52) U.S. Cl.
CPC .............. *A01M 1/026* (2013.01); *A01M 1/10* (2013.01); *G06F 18/214* (2023.01); *G06F 18/2415* (2023.01); *G06V 20/52* (2022.01); *H04N 7/188* (2013.01)

(58) Field of Classification Search
CPC ......... H04N 7/188; A01M 1/026; A01M 1/10; A01M 1/02; A01M 1/04; A01M 1/14; G06K 9/6256; G06K 9/6277; G06V 20/52
See application file for complete search history.

(56) References Cited

U.S. PATENT DOCUMENTS

| 7,496,228 B2 * | 2/2009 | Landwehr .............. G06V 10/46 382/165 |
| 8,761,436 B2 | 6/2014 | Ebling et al. |
| 9,922,049 B2 * | 3/2018 | Sugaya ................. G06V 20/52 |

(Continued)

FOREIGN PATENT DOCUMENTS

| DE | 10221124 A1 | 11/2003 |
| DE | 102007031302 A1 | 1/2009 |

(Continued)

OTHER PUBLICATIONS

Aggélou, G. et al. (2009) "Wireless Mesh Networking," McGraw-Hill Communications, 548 pages, DOI 10.1036/0071482563.

(Continued)

*Primary Examiner* — Jared Walker
(74) *Attorney, Agent, or Firm* — Morrison & Foerster LLP

(57) ABSTRACT

The disclosure relates to the detection of arthropods (beneficial insects and/or pests) in a region in which plants grow via a camera.

25 Claims, 8 Drawing Sheets

(51) Int. Cl.
  *G06F 18/214* (2023.01)
  *G06F 18/2415* (2023.01)

(56) References Cited

U.S. PATENT DOCUMENTS

| | | | |
|---|---|---|---|
| 10,729,117 B2* | 8/2020 | Tang | G06V 10/764 |
| 10,796,161 B2* | 10/2020 | Bisberg | H04N 5/23206 |
| 11,035,837 B2* | 6/2021 | Sutton | G06V 20/10 |
| 11,241,002 B2* | 2/2022 | Jay | A01M 1/106 |
| 2005/0025357 A1* | 2/2005 | Landwehr | A01M 1/145 382/224 |
| 2009/0153659 A1* | 6/2009 | Landwehr | A01M 3/005 382/165 |
| 2012/0110893 A1* | 5/2012 | Fabry | A01M 1/14 43/123 |
| 2017/0091920 A1* | 3/2017 | Suga Ya | A01M 29/16 |
| 2017/0223947 A1* | 8/2017 | Gall | A01B 79/005 |
| 2018/0177178 A1* | 6/2018 | Bhakta | A01M 29/16 |
| 2018/0279601 A1* | 10/2018 | Bogdan | G06V 20/52 |
| 2019/0166823 A1* | 6/2019 | Dick | G06V 10/82 |
| 2019/0239498 A1* | 8/2019 | Moore | G08B 21/00 |
| 2020/0178511 A1* | 6/2020 | Tang | G06V 10/30 |
| 2020/0214279 A1* | 7/2020 | Tsai | A01M 29/18 |
| 2020/0323193 A1* | 10/2020 | King | A01M 29/10 |
| 2021/0084888 A1* | 3/2021 | Lazar | G06V 40/13 |
| 2021/0329902 A1* | 10/2021 | Acharya | A01M 1/026 |
| 2021/0360204 A1* | 11/2021 | Wollenhaupt | G06V 20/52 |
| 2022/0101015 A1* | 3/2022 | Goodwin | G06V 10/24 |
| 2022/0142135 A1* | 5/2022 | Acharya | A01M 1/10 |

FOREIGN PATENT DOCUMENTS

| | | |
|---|---|---|
| DE | 102010054395 A | 6/2021 |
| EP | 2149301 A1 | 2/2010 |
| KR | 1020100127473 A | 12/2010 |
| WO | 2018054767 A1 | 3/2018 |
| WO | 2018065308 A1 | 4/2018 |
| WO | 2020058170 A1 | 3/2020 |

OTHER PUBLICATIONS

Chaudhry, M. et al. (2016) "Studying the Effects of Wind on Insects," Department of Entomology, 1 page, DOI: 10.13140/RG.2.1.3283.3521.

Fournier, F. et al. (Dec. 2005) "Effect of Barometric Pressure on Flight Initiation by Trichogramma pretiosum and Trichogramma evanescens (Hymenoptera: Trichogrammatidae)," Environmental Entomology, 34(6):1534-1540.

Graf, R. et al. (2009) "Definition of crop specific areas for planning of distribution of field trials," Journal of Cultivated Plants, 61 (7): 247-253.

International Search Report dated Dec. 17, 2019 for International Application No. PCT/EP2019/074672, filed Sep. 16, 2019, 3 pages.

Lamattine, L. et al. (2016) "Gasotransmitters in Plants—The Rise of a New Paradigm in Cell Signaling," Springer ISSN: 1867-9048, 334 pages.

López, O. et al. (2021) "Monitoring Pest Insect Traps by Means of Low-Power Image Sensor Technologies," Sensors, 12:15801-15819.

Raman, R. et al. (2007) "Detecting Insect Flight Sounds in the Field:Implications for Acoustical Counting of Mosquitoes," American Society of Agricultural and Biological Engineers, 50(4):1481-1485.

Roßberg, D. et al. (2007) "Definition of soil-climate-areas for Germany," Nachrichtenbl. Deut. Pflanzenschutzd, 59(7):155-161.

Wellington, W.G. et al. (1946) "The Effects of Variations in Atmospheric Pressure Upon Insects," Canadian Journal of Research, 24:51-70.

Wiktelius, S. (1981) "Wind Dispersal of Insects," Grana 20(3):205-207.

Witzany, G. et al. (Jul./Aug. 2006) "Plant Communication from Biosemiotic Perspective—Differences in Abiotic and Biotic Signal Perception Determine Content Arrangement of Response Behavior. Context Determines Meaning of Meta-, Inter- and Intraorganismic Plant Signaling," Plant Signaling & Behavior 1(4):169-178.

U.S. Appl. No. 17/278,054, filed May 19, 2021, for Robert Wollenhaupt et al. (Also cited as U.S. Publication No. 2021-0360204 A1) (U.S. Patent Application is not submitted herewith pursuant to the waiver of 37 C.F.R. § 1.98(a)(2)(iii) issued by the Office on Sep. 21, 2004.).

* cited by examiner

DETECTION OF ARTHROPODS

CROSS REFERENCE TO RELATED APPLICATIONS

This application is a national stage application under 35 U.S.C. § 371 of International Application No. PCT/EP2019/074672, filed internationally on Sep. 16, 2019, which claims the benefit of European Application No. 18195871.1, filed Sep. 21, 2018 and European Application No. 19171993.9, filed Apr. 30, 2019.

FIELD OF THE DISCLOSURE

The present disclosure is concerned with the detection of arthropods (beneficials and/or pests) in an area in which plants grow with the aid of a camera.

BACKGROUND

About two thirds of the species currently known are arthropods (phylum of Arthropoda), 85% of which are insects. A considerable proportion of arthropods is phytophagous: these animals feed on plants and can lead to impairment of growth, cause suction and biting damage, and transmit viral diseases. This causes, for example, considerable losses of yield and quality in the growing of crop plants.

As well as these pests, there are arthropods that are beneficial in the growing of crop plants. Such beneficials may be natural opponents of pests in that they decimate the stocks of pests or prevent their further reproduction because the pests serve as food for them or their offspring. Other beneficials are essential to the propagation of plants: honeybees, bumblebees, flies and butterflies in particular take up pollen from a flower in the search for nectar, transfer it to adjacent flowers and hence ensure pollination.

In modern agriculture, an important role is played by the detection and recognition of beneficials and/or pests within areas utilized agriculturally.

For control of infestation in relation to pests, sticky color tablets or yellow trap dishes are frequently used. Many pests, for example rape seed pests, are attracted by the yellow color of the dish or tablet. The yellow trap dish is filled with water to which a surfactant can be added in order to lower surface tension such that pests attracted are drowned. In the case of a sticky tablet, the pests remain stuck to the glue. The traps are monitored regularly. By counting the number of pests present in a trap, it is possible to ascertain damage thresholds. However, counting is laborious and prone to error.

WO2018/054767 discloses a system comprising a trap for harmful organisms, a smartphone and a server. A farmer can use the smartphone to generate digital images of the contents of the trap. The images are transmitted via a communications network to a server, where they are evaluated. The farmer receives a message from the server as to the number and species of the harmful organisms trapped. A disadvantage of the system disclosed in WO2018/054767 is that traps have to be sought out by a human to be able to conduct an infestation check.

KR1020100127473 discloses a system comprising a trap that attracts insects with the aid of an attractant (pheromone), a camera that produces images of the insects present in the trap, a transmitter unit for transmission of the images wirelessly to an analysis unit, and the analysis unit for analysis of the images. The trap can thus be monitored remotely. The trap is equipped with an adhesive layer in order to immobilize insects. More and more insects, but also soil, collect on the adhesive strip over time, such that the trap has to be sought out from time to time in order to renew the adhesive layer. A further disadvantage is that it is also possible for beneficials to get into and die in such a trap.

SUMMARY OF THE DISCLOSURE

From an agricultural point of view, significant factors are not only the infestation density with pests but also the presence of beneficials for which pests serve as food source or host, or which are important for a successful harvest for other reasons (e.g. pollinators). It is conceivable, for example, that the infestation density is high, but that pests are countered by a sufficient number of beneficials that prevents further reproduction and/or spread of the pests. It is thus conceivable that the number of a particular species of pest in a region alone does not permit any conclusion as to whether the pest can be assumed to threaten the harvest. If, at the same time, a sufficiently large number of beneficials that curbs the pests is present, the risk of a loss of harvest can be classified as low. It is conceivable that, in such a case, no measures should be taken against the pests since some measures (for example the application of insecticides) may also have adverse accompanying phenomena (e.g. resistance formation, phytotoxic properties, combating of beneficials).

The condition of the plants being grown may also be crucial as to whether there is a threat of loss of yield or not at a given infestation density, since unhealthy or weakened plants are more likely to be damaged by pests than healthy plants.

The present disclosure is dedicated to these problems.

With the aid of the present disclosure, it is possible to determine the presence of pests and/or beneficials in an area.

A "pest" is preferably understood to mean an arthropod which can appear in the growing of crop plants and damage the crop plant, or adversely affect the harvest of the crop plant.

The pest is preferably an animal pest from the group of the insects (in the various stages from larva (caterpillar, pseudocaterpillar) up to the adult stage) or arachnids. The pest is more preferably an agricultural pest, for example codling moth, aphid, thrips, summer fruit tortrix, Colorado potato beetle, cherry fruit fly, cockchafer, European corn borer, plum fruit moth, rhododendron leafhopper, turnip moth, scale insect, gypsy moth, spider mite, European grapevine moth, walnut husk fly, glasshouse whitefly, oilseed rape stem weevil, cabbage stem weevil, rape pollen beetle, cabbage shoot weevil, brassica pod midge or cabbage stem flea beetle, or a forestry pest, for example aphid, steelblue jewel beetle, bark beetle, oak splendour beetle, oak processionary moth, green oak tortrix, spruce webworm, common furniture beetle, great brown bark eater, common pine sawfly, pine beauty, pine looper, lesser spruce sawfly, pine moth, horse chestnut leaf miner, gypsy moth or brown powderpost beetle.

The term "crop plant" is understood to mean a plant which is specifically grown as a useful or ornamental plant by human intervention.

A "beneficial" is preferably understood to mean an arthropod for which a pest serves as food source or host, or which is important for a successful harvest for other reasons (for example as a pollinator). The beneficial is preferably an insect (in the various stages from larva (caterpillar, pseudocaterpillar) up to the adult stage) or an arachnid. Very particular preference is given to a pollinator (pollen donor), for example a honeybee, bumblebee, fly or butterfly, or an arthropod for which a pest serves as food source, for example an ichneumon wasp or a ladybug.

Pests and beneficials are also referred to collectively in this description as arthropods (Latin: Arthropoda). The term "arthropods" can thus have the meaning of "pests", can have the meaning of "beneficials", can have the meaning of "pests or beneficials", and can have the meaning of "pests and beneficials". The term "(specific) arthropods" may have the meaning of arthropods or the meaning of specific arthropods; this is also analogously true of the terms "(specific) pests", "(specific) beneficials" and "(specific) control means".

An "area" is understood to mean a spatially delimitable region of the Earth's surface on which the plants grow. Preferably, the area is at least partly utilized agriculturally in that crop plants are planted in one or more fields, are supplied with nutrients and are harvested. The area may also be or comprise a silviculturally utilized region of the Earth's surface (for example a forest). Gardens, parks or the like in which vegetation exists solely for human pleasure are covered by the term "area".

An area preferably includes a multitude of fields for crop plants. In a preferred embodiment, an area corresponds to a growing area for a crop plant (for definition of a growing area see, for example, Journal für Kulturpflanzen, 61 (7). p. 247-253, 2009, ISSN 0027-7479). In another preferred embodiment, an area corresponds to a biome (for definition of equivalent German term Boden-Klima-Raum see, for example, Nachrichtenbl. Deut. Pflanzenschutzd., 59(7), p. 155-161, 2007, ISSN 0027-7479).

A "sub-area" is understood to mean a preferably contiguous region within an area. A sub-area is preferably one or more fields in which a specific crop plant is being grown. The sub-area is preferably being farmed by a farmer having registered access to a multitude of imaging devices and optionally one or more plant analysis devices. Infestation densities and damage thresholds are preferably ascertained for a sub-area, especially when the area is sufficiently large that the infestation density ascertained for one sub-area exceeds a damage threshold and the infestation density ascertained for another sub-area of the same area does not exceed the damage threshold.

In crop protection, the ascertaining of damage thresholds is indispensable from an environmental and economic point of view. The damage threshold indicates the infestation density with pests over and above which control is economically viable. Up to that value, extra economic expenditure resulting from control is greater than the loss of yield to be expected. If the infestation exceeds this value, the control costs are at least compensated for by the extra yield to be expected.

According to the nature of the pest or disease, the damage threshold may be very different. In the case of pests or diseases that can be controlled only with great expenditure and with accompanying adverse effects on further production, the damage threshold may be very high. If, however, even minor infestation can become a source of spread that threatens to destroy the whole production, the damage threshold may be very low.

For assessment of the presence of pests and/or beneficials in an area, at least one imaging device is used.

In some embodiments, the present invention provides an imaging device comprising
    a collecting region,
    an imaging unit,
    a transmitter unit and
    a control unit,
wherein the control unit is configured to
    trigger the imaging unit to generate images of the collecting region, and
    trigger the transmitter unit to send the images generated and/or information regarding the images generated via a network to a computer system.

According to some embodiments, the present invention further provides a method comprising
    setting up an imaging device in an area, wherein the imaging device comprises
    a collecting region,
    an imaging unit,
    a transmitter unit and
    a control unit,
    generating images of the collecting region,
    transmitting information relating to the images to a computer system,
    analyzing the information transmitted and generating information regarding the pests and/or beneficials present in the area,
    transmitting the information regarding the pests and/or beneficials present in the area to one or more users.

According to some embodiments, the present invention further provides a computer program product comprising a computer program which can be loaded into a memory of a computer, where it prompts the computer to execute the following:
    receiving information from at least one imaging device in an area, wherein the information relates to images that have been generated from a collecting region of the at least one imaging device,
    analyzing the information received and generating information regarding the pests and/or beneficials present in the area,
    transmitting the information regarding the pests and/or beneficials present in the area to one or more users.

Further subjects of the invention and preferred embodiments are presented hereinafter. In addition, embodiments of the invention are described in detail. In this presentation and this description, no distinction is made between the individual subjects of the invention. The descriptions that follow shall instead apply analogously to all subjects of the invention, irrespective of the context in which they are made (imaging device, system, method, computer program product).

The collecting region is a region that can be sought out by arthropods (beneficials and/or pests). This may be a flat surface of a tablet or card or the like. It may also be the base of a vessel.

According to some embodiments, it is conceivable that an imaging device of the invention has multiple collecting regions. According to some embodiments, it is also conceivable that an imaging device of the invention has various collecting regions, for example a collecting region for (specific) pests and another collecting region for (specific) beneficials.

The collecting region is preferably a flat surface with a round, oval, elliptical, angular (triangular, tetragonal, pentagonal, hexagonal or generally n-angular, with n being an integer greater than or equal to 3) cross section. Preferably, the cross section is round or rectangular (especially square). The walls may extend upward from the surface, so as to result in a vessel. The vessel may, for example, be in cylindrical, conical or box-shaped form. It preferably has a round cross section, and the walls extend conically upward from the base, with base surface and wall surface preferably running at an angle of more than 90° and less than 120° relative to one another.

The collecting region may be part of a trap device for pests, for example a yellow trap dish or an optionally sticky color tablet.

Especially when the collecting region is formed by the base of a vessel, there may be at least one outflow, preferably in the base region, such that, for example, rainwater that gets into the collecting region can flow out of the collecting region via the at least one outlet. The outflow may be one or more openings in the base or in a wall adjoining the base. It is conceivable that a gutter is mounted at such an opening in order to steer the water flowing out in a defined direction. If the collecting region is part of a trap dish, an overflow may be present. The overflow may be formed, for example, by a cutout in a sidewall of the trap dish. The cutout preferably adjoins the channel, such that rainwater can flow away in a directed manner.

In a preferred embodiment, the collecting region has a flat surface arranged such that it has a slope with respect to the horizontal when the imaging device of the invention is positioned on a base or secured to a plant in an area. The horizontal runs perpendicular (at an angle of 90°) to the direction of gravity. The flat surface is thus arranged such that it and the horizontal form an angle greater than zero and not more than 90°. The flat surface is preferably arranged such that it and the horizontal form an angle in the range from 2° to 88°, preferably in the range from 5° to 80°, even more preferably in the range from 10° to 70°. Rainwater or meltwater can thus run off the surface in a problem-free manner.

As attractant, the collecting region may be configured in a color (for example yellow or red) that attracts specific pests and/or beneficials. As well as or instead of a color, it is possible for further/other means that attract arthropods to be present (attractants). A conceivable example is the use of a pheromone or a fragrance that simulates a food source, for example. Also conceivable is the use of a source of electromagnetic radiation in the infrared, visible and/or ultraviolet region for the attraction of (specific) arthropods. Also conceivable is the use of noises that imitate, for example, males and/or females ready to mate. Also conceivable is the use of specific patterns that imitate a plant, for example.

Preference is given to using one or more attractants that achieve a constant effect at least over the period between setup of the imaging device and a first maintenance. Since a color, a pattern, a shape or the like as attractant generally remains constant over such a period, they have an advantage over a pheromone that can evaporate off quickly.

In the case of use of a trap dish, this may be filled with water and optionally with one or more additions. Such an addition may, for example, be a surfactant for lowering surface tension. Such an addition may also be an attractant for attracting (specific) arthropods. Such an addition may also be a means of preventing algae formation (for example a herbicide).

In the case of a card or tablet, this may be provided with an adhesive in order to render pests immobile. In the case of a collecting region for beneficials, preference is given to dispensing with an adhesive or other means that could harm the beneficials.

In the case of the imaging device of the invention, preference is given to dispensing with any means of immobilizing and/or of trapping arthropods; this means that the collecting region of the imaging device is preferably not provided with an adhesive layer, and that the imaging device preferably does not have any liquid for trapping arthropods.

In a preferred embodiment, the imaging device comprises means of cleaning the collecting region. It is conceivable that soil collects in the collecting region over time, which makes it difficult to identify and count pests and/or beneficials. Such cleaning means may, for example, be one or more nozzles from which compressed air is blown onto the collecting region in order to blow soil away. These may be one or more nozzles from which a liquid (e.g. water, optionally with one or more additions, for example a surfactant) can be sprayed onto the collecting region in order to flush soil away. This may be an actuator that moves or rotates the surface of the collecting region to the side for soil to fall away from the surface. It is conceivable that there is a vibration mechanism that moves the collecting region back and forth and/or up and down in order to detach adhering soil. It is conceivable that two or more of the means mentioned and/or further means are combined with one another.

In a preferred embodiment, the imaging device of the invention comprises a vessel containing a gas, at least one nozzle and means of conveying the gas out of the vessel in the direction of the at least one nozzle, wherein the at least one nozzle is directed onto the collecting region. The gas may be under a pressure, for example, in the vessel and be driven out of the vessel on account of a pressure gradient between the vessel interior and the environment. The imaging device preferably comprises a valve, wherein the valve can be actuated by the control unit of the imaging device, and wherein the control unit is configured to open the valve for a predefined period of time at predefined times and/or at predefined time intervals and/or on occurrence of an event, such that gas exits from the at least one nozzle and hits the collecting region within the predefined period of time. The gas used may, for example, be air or nitrogen.

In a further preferred embodiment, the imaging device of the invention comprises a vessel with a liquid, at least one nozzle and means of conveying the liquid out of the vessel in the direction of the at least one nozzle, wherein the at least one nozzle is directed onto the collecting region. The means of conveying the liquid may, for example, be an electrically driven pump. The imaging device preferably comprises a valve, wherein the valve can be actuated by the control unit of the imaging device, and wherein the control unit is configured to open the valve for a predefined period of time at predefined times and/or at predefined time intervals and/or on occurrence of an event, such that liquid exits from the at least one nozzle and hits the collecting region within the predefined period of time. The liquid used is preferably water and/or ethanol. A surfactant may be added to the liquid in order to increase the cleaning effect.

In a preferred embodiment, the imaging device of the invention comprises a vibration drive. On activation of the vibration drive, the vibration drive sets the collecting region in a vibration (for example a back-and-forth movement and/or up-and-down movement) for a predefined period of time, preferably with a predefined frequency, for example in the range from 5 to 1000 vibrations per second. The vibration drive is preferably connected to the control unit, and the control unit is configured to activate the vibration drive for a predefined period of time at predefined times and/or at predefined time intervals and/or on occurrence of an event, such that the vibration drive sets the collecting region in vibration in the predefined period of time (for example up and down and/or back and forth). The vibration amplitude here may, for example, be 0.1 mm to 1 cm.

In a further preferred embodiment, the collecting region is mounted so as to be rotatable. In this embodiment, the imaging device of the invention preferably comprises an actuator (for example a motor) that rotates the collecting region by an angle of, for example, 90° to 180° about an axis that preferably leads through a surface of the collecting region on which arthropods may be present, in order then to move it back to the starting position. Rotation by 360° or a different angle is also conceivable. The actuator is preferably connected to the control unit, and the control unit is configured to activate the actuator at predefined times and/or at predefined time intervals and/or on occurrence of an event, such that the actuator performs one or more rotary movements of the collecting region.

In a preferred embodiment, the control unit of the imaging device of the invention is configured to receive one or more images of the collecting region from the imaging unit, to analyze the one or more images, and to activate one or more of the aforementioned cleaning means in the event of identification of soil in the collecting region.

Preferably, the imaging device of the invention has means by which the imaging device can be located on a ground surface or in a ground surface. The imaging device can preferably be secured in the ground surface in order to prevent it from falling over, for example in a storm. There are preferably means by which the distance between ground surface and collecting region can be varied. One example of such a height adjustment is a telescopic rod that can be secured in the ground surface by one end, with the collecting region mounted to the other end thereof. Another example of a height adjustment is a lifting platform. Such a variable height adjustment enables positioning of the collecting region above plants, such that flying insects can recognize and land on the collecting region when flying over the plants. The variable height adjustment allows adjustment of the height of the collecting region (distance from the ground surface) to the growing plants in order to prevent the surrounding plants from covering the collecting region. In a preferred embodiment, the height adjustment is automatic. It is preferably adjusted such that the collecting region is always above or at the height of the surrounding plants. This can be accomplished by distance sensors and/or brightness sensors.

In a preferred embodiment, the imaging device comprises a plant size sensor that measures a physical parameter that correlates with the size of plants surrounding the imaging device of the invention. The sensor converts a measured value to a signal. The imaging device also has a height adjustment unit, for example in the form of a motor with an eccentric, wherein the eccentric converts a rotary motion of the motor to a linear motion of the eccentric. The control unit of the imaging device is preferably connected to the sensor and the height adjustment unit. The control unit is configured to receive the signal from the sensor, compare it to a target value and trigger the height adjustment unit to vary the height of the imaging device until the signal corresponds to the target value.

According to some embodiments, it is also conceivable that the device of the invention has means by which it can be secured to a plant, for example a hook or a loop or a belt for securing to a twig or branch or stem.

According to some embodiments, the imaging device of the invention further comprises one or more imaging units. Such imaging unit can be used to generate digital images. An imaging unit comprises an image sensor and optical elements. The image sensor is a device for recording two-dimensional images from light by electrical means. This typically comprises semiconductor-based image sensors, for example CCD (CCD=charge-coupled device) or CMOS sensors (CMOS=complementary metal-oxide-semiconductor). The optical elements (lenses, stops and the like) serve for maximum sharpness of imaging of the object of which a digital image is to be generated on the image sensor.

The imaging unit is positioned such that the entire collecting region or at least part of the collecting region is imaged on the image sensor. It is conceivable to use multiple imaging units that image different regions of the collecting region on the respective image sensor. In the case of such a use of multiple imaging units, it is advantageous when the regions imaged at least partly overlap, in order to be able to generate an overall image in a simpler manner from the individual images at a later juncture.

According to some embodiments, the imaging device of the invention preferably has a holder on which the imaging unit is fixed or can be reversibly fixed. The holder is preferably at a defined and constant distance from the collecting region, and hence ensures a defined and constant distance between the image sensor and the collecting region. This facilitates the focusing of the collecting region.

It is conceivable that a grid or mesh (generally referred to as barrier) that prevents leaves or the like (soil) from getting into the collecting region is mounted above the collecting region. The sides of the collecting region preferably remain clear, so that pests and/or beneficials can get into the collecting region from the sides. It is alternatively conceivable that the mesh size of the mesh or the grid spacing in the grid is of such dimensions that only (specific) pests and/or (specific) beneficials get through; in such a case, the mesh or grid may also extend over the side region.

According to some embodiments, when an imaging device serves exclusively for generation of images of specific pests, a collecting region for these pests which is inaccessible to (specific) beneficials is created. This too can be achieved with the aid of a barrier. The barrier may be mounted on the collecting region or the vessel so as to give rise to an interior including the collecting region separated from the environment by the barrier: a specific pest can get into the interior only through the barrier; the barrier is designed such that many beneficials cannot penetrate it since they are too large, for example. One conceivable example is one or more openings through which only arthropods having a size that does not exceed a maximum size can get into the collecting region.

The imaging unit is preferably within the interior which is formed by the vessel/collecting region and the barrier.

For imaging of the collecting region on one or more image sensors, a light source with which the collecting region is illuminated is required, such that light (electromagnetic radiation in the infrared, visible and/or ultraviolet region of the spectrum) is scattered/reflected by the illuminated collecting region in the direction of the imaging unit. For this purpose, it is possible to use daylight. Alternatively, it is conceivable to use a lighting unit that ensures a defined illumination independent of daylight. This is preferably mounted laterally alongside the imaging unit, such that no shadows of the imaging unit are thrown onto the collecting region.

It is also conceivable to position an illumination source beneath the collecting region and/or alongside the collecting region, which illuminates the collecting region "from below" and/or "from the side", whereas an imaging unit produces one or more digital images "from the top". Such an arrangement is suitable especially when only the number of arthropods present in the collecting region (or an area density) is to be determined from one or more images; illumination from below makes the usually dark arthropods stand out very well against the bright illumination unit. However, this assumes that the base of the vessel that forms the collecting region is at least partly transparent to the electromagnetic radiation used. If a determination of species present is to be performed from one or more images, it may be necessary to allow light (from above and/or from the side) to hit and be scattered by the arthropods, which then reaches the image sensor.

It is conceivable that multiple illumination sources illuminate the collecting region from different directions.

It is conceivable that the electromagnetic spectrum of the light emitted for illumination is matched to the color of specific pests and/or specific beneficials and/or the color of the collecting region, in order to produce a maximum contrast between the arthropods and the background against which they are imaged.

In a preferred embodiment, the illumination and/or color and/or surface characteristics of the collecting region is chosen such that the electromagnetic radiation used for illumination is thrown back (reflected or scattered) more significantly by the arthropods than by the collecting region. In an alternative embodiment, the illumination and/or color and/or surface characteristics of the collecting region is chosen such that the electromagnetic radiation used for illumination is thrown back (reflected or scattered) more significantly by the collecting region than by the arthropods. Both cases ensure high contrast. A high contrast facilitates the identification of (specific) arthropods.

In a particularly preferred embodiment, light of a spectral region for which the (specific) arthropods have comparatively low absorption and transmission capacity but a high reflection and scattering capacity is used. Preferably, the vast majority of electromagnetic radiation that hits the arthropods is thrown back (reflected or scattered) thereby, and a small proportion is absorbed or transmitted. This facilitates the identification of the species present.

The collecting region preferably has a rough surface in order to avoid direct reflections of daylight from the collecting region onto the image sensor.

The term "light" and "illumination", incidentally, is not supposed to mean that the spectral region is limited to visible light (about 380 nm to about 780 nm). It is likewise conceivable that illumination is effected using electromagnetic radiation having a wavelength below 380 nm (ultraviolet light: 100 nm to 380 nm) or above 780 nm (infrared light: 780 nm to 1000 µm). The image sensor and the optical elements are matched to the electromagnetic radiation used.

According to some embodiments, the imaging device of the invention further comprises a control unit. The control unit triggers the at least one imaging unit to record digital images. Images may be generated regularly or irregularly.

The control unit may be configured to route the images recorded to a transmitter unit in order to send them via a radio network to a separate computer system. The images can then be viewed and/or analyzed (in an automated manner) on the computer system.

According to some embodiments, it is alternatively conceivable that the imaging device of the invention has an analysis unit configured to analyze the images generated in an automated manner. The analysis may serve to ascertain the number of pests and/or beneficials present in the collecting region. The analysis may also serve to identify the species of pests and/or beneficials present in the collecting region.

According to some embodiments, the transmitter unit of the imaging device of the invention is configured to send information relating to the one or more images via a network to a computer system. This information may be the one or more images themselves. It is alternatively conceivable that this information is the results of the analysis by the evaluation unit, i.e. the number of pests and/or beneficials present and/or the species identified in each case. It is also conceivable that an alarm signal is sent if the automated analysis of at least one image shows that a specific pest has been identified and/or the number of (specific) pests and/or (specific) beneficials has gone above or below a predefined threshold. An alarm may also be triggered by the presence of soil that cannot be removed from the collecting region by a cleaning agent, for example.

The transmitter unit may be configured such that it transmits information via a mobile communications network (e.g. GSM: Global System for Mobile Communications, GPRS: General Packet Radio Service; UMTS: Universal Mobile Telecommunications System, LTE: Long Term Evolution), via a WLAN (Wireless Local Area Network), via Bluetooth, via DECT (Digital Enhanced Cordless Telecommunications) via a low-power wide-area network (LPWAN or LPN)), for example a NarrowB and IoT network and/or via a combination of different transmission routes.

In a preferred embodiment, the transmitter unit is configured such that it transmits information via a short-range (radio) link to a base station, from which the information is then transferred to cable and/or passed on via a long-range radio connection. The term "short-range" means that the distance between transmitter and receiver is preferably not greater than 5 km, more preferably not greater than 1 km. A greater distance than the specified maximum distance would mean that faultless transmission of data from the transmitter to the receiver is no longer assured. The term "long-range" means that the distance between transmitter and receiver is preferably greater than 1 km, more preferably greater than 5 km. Communication via a short-range link can be effected, for example, by means of radio, ultrasound and/or (laser) light.

It is conceivable to match the times for generation of images to environmental conditions. It is conceivable, for example, to configure the control unit such that no images are created at night. Such a configuration can be achieved, for example, via a brightness sensor or a time switch.

According to some embodiments, the imaging device of the invention may further comprise at least one presence sensor.

A preferred embodiment of the present invention is an imaging device comprising
   a collecting region,
   an imaging unit,
   a transmitter unit,
   a control unit and
   a sensor
   wherein the sensor is configured to
     detect a physical property in its environment that correlates with the probability of the presence of an arthropod in the collecting region, and
     convert the property detected to a signal,
   wherein the control unit is configured to
     trigger the imaging unit to generate images of the collecting region, and
     trigger the transmitter unit to send the images and/or information regarding the images via a network to a computer system, wherein the control unit is configured to
fix the times at which and/or the frequency in which the images are generated and/or at/in which the images and/or information regarding the images are sent to the computer system via the network, on the basis of the signal from the sensor.

According to some embodiments, the present invention further preferably provides a method comprising:
setting up an imaging device in an area, wherein the imaging device comprises
a collecting region,
an imaging unit,
a transmitter unit,
a presence sensor and
a control unit,
detecting a physical property in an environment of the collecting region with the presence sensor, wherein the physical property correlates with the probability of the presence of an arthropod in the collecting region,
generating images of the collecting region and
sending the images and/or information regarding the images via a network to a computer system,
wherein the times and/or the frequency in time for the generation of images of the collecting region and/or for the sending of the images and/or the information regarding the images via a network to a computer system is/are fixed depending on the probability that one or more arthropods are present in the collecting region.

According to some embodiments, the present invention further preferably provides a computer program product comprising a computer program which can be loaded into a memory of a computer, where it prompts the computer to execute the following:
receiving a signal, wherein the signal includes information as to the probability that an arthropod is present in a collecting region,
controlling the generation of images of the collecting region and the sending of the images and/or of information regarding the images via a network to a computer system, wherein the times and/or the frequency in time for the generation of images of the collecting region and/or for the sending of the images and/or the information regarding the images via a network to the computer system is/are fixed depending on the probability that arthropods are present in the collecting region.

In general, a "sensor", also referred to as detector, (measurement parameter or measurement) transducer or (measurement) sensor, is a technical component capable of qualitatively detecting or quantitatively detecting, as a measurement parameter, the particular physical or chemical property and/or the physical characteristics of its environment. These parameters are detected by means of physical or chemical effects and transformed to a further-processable, usually electrical or optical signal.

The presence sensor detects a physical or chemical property in its environment that correlates with the probability of the presence of an arthropod in the collecting region.

"Environment" means at a maximum distance from the presence sensor of preferably not greater than 10 meters, more preferably not greater than 1 meter, more preferably not greater than 10 cm, from the collecting region.

"Correlation" means that the probability of presence of an arthropod in the collecting region changes when the physical property changes. The probability of the presence of an arthropod in the collecting region may be greater here when the value of the physical property becomes greater within a defined range of values, and smaller when the value of the physical property becomes smaller within the defined range of values (positive correlation). The probability of the presence of an arthropod in the collecting region may alternatively be smaller when the value of the physical property becomes greater within a defined range of values, and greater when the value of the physical property becomes smaller within the defined range of values (negative correlation). The correlation may be linear or nonlinear within a range of values. The correlation is preferably characterized by a correlation coefficient in the range from 0.5 to 1. The correlation is preferably characterized by a causal relationship.

The presence sensor converts one or more values that represent(s) the physical or chemical property to a signal. The signal is transmitted to the control unit. The expression "transmission" includes the operation of the control unit calling up the signal from the sensor, or generally that a receiver calls up data from a transmitter. The expression "signal" means that information is transmitted from the sensor to the control unit, which is interpreted by the control unit. The signal may be an analog or digital signal. It is conceivable that there are multiple presence sensors that transmit multiple signals to the control unit.

A signal typically leads to an action by the control unit (or generally by the receiver of the signal).

In one embodiment of the present invention, the control unit, on the basis of at least one signal, stipulates the times at which the imaging unit generates images of the collecting region.

In a further embodiment of the present invention, the control unit, on the basis of at least one signal, stipulates the frequency in time with which the imaging unit generates images of the collecting region.

In a further embodiment of the present invention, the control unit, on the basis of at least one signal, stipulates the times at which and the frequency in time with which the imaging unit generates images of the collecting region.

In a further embodiment of the present invention, the control unit, on the basis of at least one signal, stipulates the times at which the transmitter unit transmits the images and/or information regarding the images via a network to the computer system.

In a further embodiment of the present invention, the control unit, on the basis of at least one signal, stipulates the frequency in time with which the transmitter unit transmits the images and/or information regarding the images via a network to the computer system.

In a further embodiment of the present invention, the control unit, on the basis of at least one signal, stipulates the times at which and the frequency in time with which the transmitter unit transmits the images and/or information regarding the images via a network to the computer system.

The signal may include information regarding the probability that a (specific) pest and/or a (specific) beneficial is present in the collecting region, and/or the signal may correlate with the probability that a (specific) pest and/or a (specific) beneficial is present in the collecting region.

Times at which the imaging unit generates images of the collecting region and/or at which the transmitter unit transmits the images and/or information regarding the images via a network to the computer system may be fixedly predefined times or times that can be ascertained, for example 12 o'clock midday on a particular day or on a particular day of the week or every day. The control unit may be configured such that it ascertains (e.g. calculates) the particular times on the basis of at least one signal. It is also conceivable that the control unit is configured such that it selects particular predefined times on the basis of the at least one signal from a list of predefined times. Also conceivable is a combination of ascertaining and selecting.

Times at which the imaging unit generates images of the collecting region and/or at which the transmitter unit transmits the images and/or information regarding the images via a network to the computer system may also be triggered by events. It is conceivable, for example, that the at least one signal indicates the occurrence of a defined event and the control unit ascertains and/or selects one or more times on the basis of the event that has occurred. It is conceivable that the occurrence of an event triggers the generation of an image of the collecting region and/or the transmission of the image and/or information regarding the image via a network to the computer system.

The expression "frequency in time" is understood to mean a rate with which images are generated and/or images and/or information regarding the images is transmitted to a computer system. This may be a regular rate (e.g. once per day, once per hour, once per week, every 10 minutes etc.) or an irregular rate, in the case of which, however, an average can be specified (e.g. arithmetic average). The frequency in time may also assume the value of "zero"; in such a case, at least over a defined period of time (that can be fixed by defined times), no images are generated and/or no images and/or information regarding the images is transmitted to a computer system.

The presence sensor can, for example, fix a combination of times and frequencies in time, for example every 10 minutes between 5:00 and 21:00 hours, or every hour whenever a particular first event occurs and once per day whenever a particular second event occurs.

The presence sensor may, for example, be a timer. There are arthropods that are active solely at particular times of day or night. The probability that such an arthropod will be in the collecting region at the particular time of day or night is thus greater than at other times of day or night. Using the timer, the control unit can stipulate that images are generated and/or information is transmitted, for example, only during a defined period of the day or night.

According to some embodiments, the device of the invention preferably has at least one presence sensor that is not a timer.

The presence sensor may, for example, be a brightness sensor that detects the brightness around the collecting region or in the collecting region or around the imaging device of the invention as a physical property. There are arthropods that are active only or preferably under particular brightness conditions (for example moths preferably in darkness). The brightness sensor used may be a photocell or a photodiode. These can be used to measure the intensity of light in a specific wavelength range.

The presence sensor may, for example, be a temperature sensor. There are arthropods that are active solely or preferably within a particular temperature range. Many species of bee cease to fly below 12° C. and preferably remain in the beehive. The temperature in the imaging device of the invention or in the environment of the imaging device thus correlates with the probability of encountering (specific) arthropods in the collecting region. Temperature sensors are available in various forms, for example in the form of a thermocouple, semiconductor temperature sensor, temperature sensor with crystal oscillator, pyrometer, thermal imaging camera and so forth.

The presence sensor may, for example, be a moisture sensor. There are arthropods that avoid rain. The probability that an arthropod will get into the imaging device of the invention when it is raining is thus lower than in dry weather. The moisture sensor may be a measuring instrument for determination of air humidity (hygrometer). Examples of standard hygrometers are absorption hygrometers (e.g. hair hygrometers, spiral hygrometers, capacitive sensors, impedance sensors), psychrometers and optical hygrometers. Preference is given to using a capacitative sensor or an impedance sensor (resistive hygrometer). Also conceivable is a sensor for measurement of soil moisture content, in addition to or instead of the measurement of air humidity. Also conceivable is a sensor for measurement of precipitation (precipitation meter).

The presence sensor may, for example, be an air pressure sensor. There are arthropods that react to changes in air pressure (see, for example, F. Fournier et al.: Effect of Barometric Pressure on Flight Initiation by Trichogramma pretiosum and Trichogramma evanescens, Environmental Entomology, Vol. 34(6), 2005, pages 1534-1540; W. G. Wellington: The effects of variations in atmospheric pressure upon insects, Canadian Journal of Research, 1946, Vol. 24d, No. 2, pages 51-70). Specific changes in air pressure can therefore increase or reduce the probability of encountering a (specific) arthropod in the collecting region.

The presence sensor may, for example, be a wind gauge. Wind can exert an influence on the physiology and behavior of arthropods (see, for example, M. Chaudhry et al.: Studying the Effects of Wind on Insects, Poster, DOI: 10.13140/RG.2.1.3283.3521). In addition, the spread of arthropods can be influenced by wind (see, for example, S. Wiktelius: Wind dispersal of insects, Grana 20: 205-207, 1981, ISSN 0017-3134). The probability of finding a (specific) arthropod in the collecting region may thus correlate with the strength and/or direction and/or duration of wind.

The presence sensor may, for example, be a sensor for chemical substances in the air, for example a gas chromatograph (GC) or a mass spectrometer (MS) or a GC/MS combination. It is thus possible to detect, for example, substances that are released by plants in reaction to infestation with a pest (G. Witzany: Plant Communication from Biosemiotic Perspective, Plant Signal Behav. 2006 July-August; 1(4): 169-178; Signaling and Communication in Plant, Series Ed.: C. Garcia-Mata, Springer ISSN: 1867-9048).

The presence sensor may, for example, be a microphone. The microphone detects sounds and/or noises that are produced by a (specific) pest and/or by a (specific) beneficial. The sounds and/or noises can be used to detect the presence of a species (see, for example: Detecting Insect Flight Sounds in the Field: Implications for Acoustical Counting of Mosquitoes, Transactions of the ASABE, 2007, Vol. 50(4): 1481-1485).

The presence sensor may, for example, be part (preferably a photodiode or image sensor) of a light barrier. A light barrier is a system that recognizes the interruption of a light beam and indicates it as an electrical signal. In this way, it is possible to contactlessly detect moving objects. The light barrier may be mounted such that it detects an arthropod that gets into the collecting region. The light barrier may be mounted such that it detects an arthropod that gains access to the collecting region or to the imaging device of the invention via an entrance. The term "light barrier" also includes light grids or light curtains that work with multiple (parallel) light beams.

The presence sensor may be a camera. The camera may comprise an image sensor and optical elements. The image sensor is a device for recording two-dimensional images from light by electrical means. This typically comprises semiconductor-based image sensors, for example CCD (CCD=charge-coupled device) or CMOS sensors (CMOS=complementary metal-oxide-semiconductor). The optical elements (lenses, stops and the like) serve for maximum sharpness of imaging of an object on the image sensor. The camera may be configured such that the collecting region or at least a portion thereof is imaged on the image sensor. The image sensor may be read out and analyzed by a control unit of the camera. Image analysis methods and/or machine-learning algorithms may be used to detect the presence of a (specific) arthropod in the collecting region. The camera may be an imaging unit of the imaging device of the invention or a separate component.

The presence sensor may, for example, be a motion sensor. A motion sensor is an electronic sensor that can detect motion in its immediate environment and hence work as an electrical switch. A motion sensor can work actively with electromagnetic waves (HF, microwaves or Doppler radar), with ultrasound (ultrasound motion sensors), or passively, like a pyroelectric sensor, with electromagnetic radiation which is emitted by an object or its environment. The motion sensor may be configured such that it detects motion of a (specific) arthropod in the collecting region or in the environment of the collecting region.

In a preferred embodiment, the generation of images and/or the transmission of images and/or information regarding the images to a computer system is/are matched to the probability of a (specific) arthropod being present within the collecting region. The probability of an image being generated and/or an image generated and/or information regarding the image generated being transmitted by the imaging device of the invention to a separate external computer system preferably rises with the probability of a (specific) arthropod being present within the collecting region. This has the advantage that fewer needless images on which no (specific) arthropod has been imaged are generated and/or transmitted. This has the advantage that the imaging device of the invention consumes less energy. This has the advantage that the imaging device of the invention need not be sought out so frequently in order to renew or charge the energy source. Moreover, fewer images depicting no (specific) arthropod are unnecessarily viewed and/or analyzed.

In a preferred embodiment, one or more images of the collecting region are generated when at least one presence sensor detects the presence of a (specific) arthropod (beneficial and/or pest) in the collecting region or in the entry region of the imaging device. Preference is given to generating multiple images (e.g. 2, 3, 4, 5, 6, 7, 8, 9, 10 or more) in a time sequence (for example at an interval of 1 second, or 2 seconds or 3 seconds or 4 seconds or 5 seconds or at a different time interval).

In a further preferred embodiment, at least one image of the collecting region is generated and the at least one image and/or information regarding the at least one image is transmitted to a computer system when at least one presence sensor detects the presence of a (specific) arthropod (beneficial and/or pest) in the collecting region or in the entrance region of the device.

In a further preferred embodiment, one or more images of the collecting region are generated and/or images and/or information regarding the images is transmitted to a computer system only when the probability of a (specific) arthropod being present within the collecting region exceeds a predefined threshold. The predefined threshold may, for example, be 30% or 40% or 50% or 75% or a different percentage.

In a preferred embodiment, multiple presence sensors are used and the generation of images and/or the transmission of images and/or information regarding the images is made dependent on the signals from the multiple presence sensors. For example, it is conceivable to use a first presence sensor (for example a timer or a brightness sensor) that ascertains whether it is day or night. Images are generated, for example, only at particular times of day or night or at particular brightnesses. A second presence sensor can ascertain the temperature, for example. Images are generated, for example, only within a particular temperature range. Further combinations are conceivable.

The imaging device of the invention has an energy supply unit in order to supply the electronic components with electrical energy. The energy supply unit is preferably a mobile unit, for example an electrochemical cell (battery), an accumulator and/or a solar cell. Particular preference is given to a combination of a chargeable accumulator and a solar cell, in order to keep maintenance complexity low on the one hand (no battery change needed) and in order to assure energy supply even in the case of few hours of sunlight on the other hand (a pure solar cell is reliant on a minimum of solar energy).

The frequency of generation of images can be made dependent on the amount of electrical energy available for supply of the device of the invention. If energy supply is to be accomplished using an electrochemical cell (battery) or a rechargeable accumulator that has to be renewed/charged just once per year, for example, it is possible to create only as many images as the amount of electrical energy available for one year.

According to some embodiments, the present invention further provides a system comprising
   a multitude of imaging devices in an area, wherein each imaging device comprises
      a collecting region,
      an imaging unit,
      a transmitter unit and
      a control unit,
   wherein the control unit is configured to
      trigger the imaging unit to generate images of the collecting region, and
      trigger the transmitter unit to send information relating to the images via a network to a computer system,
   the computer system which is configured to
      receive the information relating to the images from the multitude of imaging devices,
      analyze the information received to obtain information regarding the pests and/or beneficials present in a sub-area,
      transmit the information regarding the pests and/or beneficials present in a sub-area to one or more users.

According to some embodiments, the present invention further provides a method comprising:
   setting up a multitude of imaging devices in an area, wherein each imaging device comprises
      a collecting region,
      an imaging unit,
      a transmitter unit and
      a control unit,
   generating images of the collecting region of each imaging device,
   transmitting information relating to the images to a computer system, analyzing the information transmitted and generating information regarding the pests and/or beneficials present in a sub-area, transmitting the information regarding the pests and/or beneficials present in a sub-area to one or more users.

According to some embodiments, the imaging devices of the system of the invention are preferably distributed over an area. The distance between them is typically between 10 meters and 10 kilometers. They are preferably set up in fields of a specific crop plant (e.g. oilseed rape) since such fields have characteristic fauna. Preference is given to analyzing the fauna (pests/beneficials) living in the fields of the specific crop plant by executing the invention.

With the imaging device of the invention, it is possible to analyze which pest/beneficials and how many pests/beneficials are present in the area (e.g. field) in which the imaging device is set up.

According to some embodiments of the invention, therefore, pests and/or beneficials are counted with the aid of an imaging device and the species present in each case is determined.

According to some embodiments, it is conceivable that an imaging device of the invention counts and identifies both pests and beneficials. It is alternatively conceivable that different imaging devices are used, one type of which is set up to identify and determine the amount of (specific) pests and another type to identify and determine the amount of (specific) beneficials.

It is conceivable to adjust the times for generation of images and/or the transfer of information relating to the images from one imaging device via a network to an external computer according to the results of the analysis of images that have been generated by other imaging devices. If the analysis of the images shows, for example, that pests are spreading in a direction, it is conceivable to shorten the time intervals for generation of images in the imaging devices present in that direction (or to increase the frequency in time of the generation of images).

A preferred embodiment of the present invention is thus a system comprising a multitude of imaging devices in an area, wherein each imaging device comprises
a collecting region,
an imaging unit,
a transmitter unit,
a receiver unit and
a control unit,
wherein the control unit of each imaging device is configured to
trigger the imaging unit to generate images of the collecting region, and
trigger the transmitter unit to send information relating to the images via a network to a computer system,
the computer system which is configured to
receive the information relating to the images from the multitude of imaging devices,
analyze the information received to obtain information regarding the pests and/or beneficials present in a sub-area,
transmit a message to one or more imaging devices when a number or amount of pests and/or beneficials in the sub-area changes in a predefined manner,
wherein the receiver unit of each imaging device is configured to receive a message transmitted to the imaging device,
wherein the control unit of each imaging device is configured to adjust the times at which and/or the frequency in which the images are generated and/or at/in which the images and/or information regarding the images are sent to the computer system via the network, on the basis of the message.

A further preferred embodiment is a method comprising:
setting up a multitude of imaging devices in an area, wherein each imaging device comprises
a collecting region,
an imaging unit,
a transmitter unit and
a control unit,
generating images of the collecting region of each imaging device,
transmitting information relating to the images to a computer system,
analyzing the information transmitted and generating information regarding the pests and/or beneficials present in a sub-area,
identifying a change in an amount of one or more pests and/or beneficials over time in the sub-area,
transmitting information regarding the change over time to one or more imaging devices,
adjusting the times at which and/or the frequency in which images are generated and/or at/in which images and/or information regarding the images are sent to the computer system via the network to the change over time.

Such an adjustment may mean, for example, that the frequency in time is increased when the area density of a (specific) beneficial and/or (specific) pest rises.

Such an adjustment may mean, for example, that the times are fixed on the basis of the presence of a (specific) beneficial and/or (specific) pest, for example in such a way that images are generated at defined times of the day because the (specific) beneficial and/or the (specific) pest is active at those times of day.

In a preferred embodiment, the times and/or the frequency in time at which/in which images are generated by imaging devices in a defined sub-area and/or at which/in which images and/or information regarding the images is sent via the network to the computer system is/are adjusted on the basis of the information regarding the pests and/or beneficials present in an adjacent sub-area or in multiple adjacent sub-areas. If (specific) pests and/or (specific) beneficials occur in a sub-area, it is possible to increase the frequency in time in which images are generated and/or the images and/or information regarding the images is sent to the computer system via the network in imaging devices in adjacent sub-areas.

It is also conceivable that the generation of images is triggered by remote control. It is conceivable, for example, that a user in a remote location, for example via a communications network, triggers the imaging device of the invention to generate a digital image.

In a particularly preferred embodiment, multiple imaging devices form a mesh, meaning that information is passed onward from one imaging device to another, preferably via a short-range radio connection. An imaging device is ultimately present close to a base station, or has means of transferring the information over a greater distance than the distance between the individual imaging devices that form the mesh. The base station preferably transmits the information via a long-range radio connection (e.g. the mobile communications network) and the Internet to the computer system. Details of the construction of a mesh can be taken from the extensive literature on this subject (see, for example, G. Aggélou: Wireless Mesh Networking, McGraw-Hill 2009, DOI 10.1036/0071482563; Y. Zhang et al.: Wireless Mesh Networking, Auerbach Publications 2007, ISBN: 0-8493-7399-9).

A preferred embodiment of the present invention is thus a system comprising
- at least one base station,
- a computer system,
- a first imaging device in an area and
- a second imaging device in the area,
- wherein the first imaging device comprises
  - a collecting region,
  - an imaging unit,
  - a transmitter unit, and
  - a control unit,
- wherein the second imaging device comprises
  - a collecting region,
  - an imaging unit,
  - a transmitter unit,
  - a receiver unit, and
  - a control unit,
- wherein the control unit of the first imaging device is configured to
  - trigger the imaging unit of the first imaging device to generate first images of the collecting region of the first imaging device,
  - trigger the transmitter unit of the first imaging device to transmit the first images and/or information regarding the first images via a short-range radio link to the second imaging device,
- wherein the control unit of the second imaging device is configured to
  - trigger the receiving unit of the second imaging device to receive the first images,
  - trigger the imaging unit of the second imaging device to generate second images of the collecting region of the second imaging device,
  - trigger the transmitter unit of the second imaging device to transmit the first images and the second images and/or information regarding the first images and the second images via a short-range radio link to the base station,
- wherein the base station is configured to
  - receive the first images and the second images and transfer them via a long-range radio link to the computer system,
- wherein the computer system is configured to
  - receive the images transferred,
  - analyze the images transferred to obtain information regarding the pests and/or beneficials present in the area,
  - transmit the information regarding the pests and/or beneficials present in the area to one or more users.

A further preferred embodiment of the present invention is a method comprising:
- setting up a multitude of imaging devices in an area, wherein each imaging device comprises
  - a collecting region,
  - an imaging unit,
  - a transmitter unit,
  - a receiver unit and
  - a control unit,
- generating a first image of the collecting region of a first imaging device by means of the imaging unit of the first imaging device,
- transmitting the first image from the first imaging device to a second imaging device via a short-range radio connection,
- receiving the first image by means of the second imaging device,
- generating a second image of the collecting region of the second imaging device by means of the imaging unit of the second imaging device,
- transmitting the first image and the second image from the second imaging device to a base station via a short-range radio connection,
- transmitting the first image and the second image from the base station to a computer system via a network comprising a long-range radio connection,
- analyzing the first image and the second image by means of the computer system and generating information regarding the pests and/or beneficials present in the area,
- transmitting the information regarding pests and/or beneficials present in the area to one or more users.

In a preferred embodiment, one or more plant analysis device(s) is/are constituent(s) of the system of the invention. A plant analysis device, like an imaging device, comprises an imaging unit (with image sensor and optical elements), a transmitter unit, and a control unit. The plant analysis device serves to analyze the condition of the plants being grown (especially of the crop plants, but also sacrificial plants and/or protective plants present) and optionally to identify and assess damage that has been caused by pests. Such a plant analysis device may be set up, for example, in a stationary manner in a field for crop plants, and be directed there onto parts of a crop plant (leaves, blossom, stem, fruit bodies and/or the like), in order to produce images of these parts. It is also conceivable that it is a mobile device, for example an (unmanned) vehicle or an (unmanned) aircraft (drone) that moves within a field or over a field and generates images of the plants being grown. Images may be generated regularly or irregularly. They may be recorded at defined times. It is conceivable to match the times for generation of images to environmental conditions. It is conceivable to match the times for generation of images to the results of the analysis of images that have been generated by imaging devices and/or other plant analysis devices. It is conceivable that the generation of images is triggered by remote control. The images may be examined for the presence of damage (preferably damage by eating). Information relating to the images is transmitted by the plant analysis device to the computer system. The information transmitted may be the images themselves and/or results of one or more analyses of the images. The images can be analyzed in order to determine the state of development of the plants being grown (for example by the BBCH code). The images can be analyzed in order to determine the state of health of the plants being grown (for example deficiencies).

Each imaging device and/or each plant analysis device is preferably assigned to a position. This is typically the position where the respective device generates images. It may alternatively be a position in the environment of a device (for example the position of a base station with which the respective device is connected via a radio connection), or the position may be fuzzy in that, for example, a region on the Earth's surface where the device is present is specified (in the form of a circle with a defined radius).

In a preferred embodiment, the system of the invention has means of determining the position of the devices.

It is conceivable that the device (imaging device and/or any plant analysis device) has a GPS sensor (GPS: global positioning system) or another sensor of a global satellite navigation system (GNSS) with which the position of the device can be ascertained.

One advantage of determining position by means of a global satellite navigation system is high accuracy. Disadvantages are the additional component costs and the comparatively high energy demand.

It is also conceivable that the position is determined by means of the radio cell to which the transmitter unit is connected. Such a solution typically has a lower accuracy than determination of position, but means lower component costs and a lower energy demand.

In mobile communications, the simplest way of determining position is based on the fact that the cell in which a transmitter unit is present is known. Since, for example, a switched-on mobile phone is connected to a base station, the position of the mobile phone can be assigned to at least one mobile communications cell (cell ID). It is also possible to proceed analogously with a device of the invention.

With the aid of GSM (Global System for Mobile Communications), the position of a transmitter unit can be determined accurately to several hundred meters. In towns, the position can be determined accurately to 100 to 500 m; in rural areas (in which the density of base stations is lower), the radius is increased to 10 km or more. If the information is combined with the TA parameter (TA: Timing Advance) via the cell ID, the accuracy can be increased. The higher this value, the greater the distance of the transmitter unit from the base station. It is possible to locate a transmitter unit even more accurately by the EOTD method (EOTD: Enhanced Observed Time Difference). This determines the differences in transit time of the signals between the transmitter unit and multiple receiver units.

In one embodiment, information is ascertained and position is determined by means of the Sigfox grid. Sigfox is a low-power wide-area network (LPWAN) and is specifically designed for small data packets and very power-saving operation. Sigfox can communicate over long distances without disruption. The range of a single base station, which can control up to one million transmitter units, is 3 to 5 km in areas of high population density and 30 to 70 km in rural areas. In the case of Sigfox, the data packets are received by all base stations in the transmitter region. This can be used to determine the position of a transmitter unit.

It is also conceivable that the position of a device is detected when it is registered. In such a case, one step of the registration is the association of device and position. It is conceivable that a user, by means of a mobile computer system (e.g. a smartphone or a tablet computer or the like), detects an unambiguous identifier of the device and associates it with position information. The unambiguous identifier serves for identification of the device when it is registered. The unambiguous identifier may be a number or an alphanumeric code or a binary code or the like which is mounted on the device or recorded in a data storage means of the device. The unambiguous identifier can be detected, for example, by input via an input device (e.g. a keyboard, a touch screen, a microphone (by speech input) or the like) into the mobile computer system. Preferably, the unambiguous identifier takes the form of an optically readable code (for example a barcode or matrix code or the like) or of an electronic storage means that can be read out by radio (e.g. in the form of an RFID tag) or the like. This has the advantage that the unambiguous identifier can be read out automatically with the mobile computer system, and input errors (as in the case of a user typing it in using a keyboard) are avoided. An optical code can be detected, for example, with a camera that may be part of the mobile computer system. In a further step, the position is determined. It is conceivable that the means of determining position are provided by the user's mobile computer system. The mobile computer system may, for example, be a smartphone with which the position is determined via the radio cell to which the smartphone is connected, or with a GPS sensor associated with the smartphone.

If the unambiguous identifier has been detected and the position determined, these pieces of information are associated with one another. The association assigns the device to a position. It is conceivable that the associated information is transmitted via a network to an external computer system and stored therein. It is also conceivable that the associated information is stored on the user's mobile computer system.

On registration, preference is given to additionally associating the unambiguous identifier of the device with an unambiguous identifier of the user, such that the user is assigned an individual device (or multiple devices) with a defined position. As a result of this association, the user is preferably able to receive only images from the device assigned to the user.

The information which is transmitted by the devices present (imaging devices and optionally plant analysis devices) by means of the corresponding transmitter units to a computer system can be processed, analyzed, archived and/or issued to a user therein.

A "computer system" is a system for electronic data processing that processes data by means of programmable computation rules. Such a system typically comprises a "computer", that unit which comprises a processor for performing logic operations, and also peripherals.

In computer technology, "peripherals" refer to all devices which are connected to the computer and serve for control of the computer and/or as input and output devices. Examples thereof are monitors (screen), printers, scanners, mice, keyboards, drives, cameras, microphones, loudspeakers, etc. Internal ports and expansion cards are also considered to be peripherals in computer technology.

Today's computer systems are frequently divided into desktop PCs, portable PCs, laptops, notebooks, netbooks and tablet PCs and so-called handhelds (e.g. smartphones); all these systems can be utilized for execution of the invention.

Inputs into the computer system are made via input devices, for example a keyboard, a mouse, a microphone and/or the like. "Input" shall also be understood to mean the selection of an entry from a virtual menu or a virtual list or clicking on a selection box and the like.

A system of the invention typically has a multitude (at least 10, preferably more than 20) imaging devices and optionally plant analysis devices (referred to collectively as devices) that are assigned to a computer system.

The devices and the computer system are connected to one another via a network, such that the devices can transmit information (data, images, status information, sensor data or the like) to the computer system. According to some embodiments, it is also conceivable that the system of the invention is configured such that the computer system can transmit information or control commands to the devices. The network via which the computer system and the devices are connected to one another is at least partly a radio network. Typically, information is transmitted from a device via a transmitter unit by radio to a base station, from which it is passed onward (optionally via further stations) by radio and/or via cable to the computer system.

According to some embodiments, the system of the invention is configured such that the corresponding devices—set up or activated at a location—automatically generate images.

In one embodiment of the present invention, the devices transmit the images generated to the computer system. The images transmitted are analyzed on the computer system; this ascertains the number of pests and/or beneficials present in the collecting region, identifies the species present and, in the case of existence of one or more plant analysis devices, the images are examined in relation to the status of the plants and/or for the presence of damage and, if appropriate, the level of damage is ascertained.

In an alternative embodiment, the images generated are analyzed by an evaluation unit in the respective device. For example, it is possible to ascertain the number of pests/beneficials present in the collecting region. This number can then be transmitted to the computer system. It is possible to identify the species present. The names of the species can then be transmitted to the computer system. The status of the plants grown can be ascertained. The status is then transmitted to the computer system. It is conceivable that the images generated are likewise transmitted to the computer system. It is conceivable that an image generated is transmitted to the computer system together with the result of the analysis in the respective device. It is conceivable that the images generated are transmitted to the computer system only after a request by a user.

The analysis of the images that have been generated by the imaging devices may serve to ascertain whether an organism in the image is a harmful organism, a pest, a beneficial or an organism of no significance to the growing of the crop plants. Accordingly, identification may mean assignment to the three categories: "harmful", "beneficial" and "neutral". The identification of a pest preferably serves to identify measures that can be taken against the pest. A measure to be taken may, for example, be the application of a particular pest control means.

Identification may alternatively be understood to mean the assignment of individual pests/beneficials to a taxon, i.e. assignment to a class, order, superfamily, family, subfamily, tribe, genus, species, subspecies or to an intermediate stage for the purposes of biological taxonomy.

In the identification of beneficials, the aim may be to identify those beneficials for which a pest present in a sub-area serves as food source or host.

The identification and counting of the pests/beneficials is preferably automated. This means that a user does not have to count and identify the arthropods in an image themself; instead, the respective image is sent to image processing and image recognition algorithms by a computer program in a working memory of a computer system. With the aid of these algorithms, the image is analyzed and optionally prepared (filtrations and similar operations), and features that permit a conclusion as to how many arthropods are present and their species are extracted. Such algorithms are described in the prior art.

It is conceivable to identify pests/beneficials using an artificial neural network that has been trained beforehand on a multitude of images of known pests/beneficials.

Preference is given to using further information for identification of the pests/beneficials. For example, it is possible to utilize the position information (e.g. geocoordinates). If the respective imaging device is in Germany, for example, different pests/beneficials will be considered than if the imaging device is in Brazil, for example. The current season is also an important piece of information that can be utilized.

According to the season, different pests/beneficials can appear. It is also possible for the plants being grown (crop plants, protective plants, sacrificial plans) to give information as to the pest/beneficial harmful organism.

The analysis of the images that are generated by the at least one plant analysis device is also automated. Preference is given to using artificial intelligence algorithms, more preferably self-teaching systems. These algorithms are capable of determining the state of development of the plants being grown from specific features, for example leaf size, leaf shape, number of leaves, presence of blossom, shape and size of blossom and the like. Damage to plants or plant parts, especially damage by eating, and the extent of the damage can likewise be recognized and quantified in an automated manner as a variance from the normal state.

According to some embodiments, it is conceivable that a system of the invention comprises two computer systems (a first and a second computer system). The first computer system is a server connected via a network to the devices (imaging devices and optionally plant analysis devices). This server receives all the information transmitted by the devices (e.g. images, analysis results, status messages and the like). The information can be analyzed and archived on the server. For example, analysis of the images can take place on the server. The second computer system (client) is connected to the first computer system (server) and can request information (images, analysis results and the like). The second computer system is typically operated by an end user (for example a farmer) who has set up one or more devices, for example in one of the farmer's agriculturally utilized fields, and would like to conduct an infestation check. The first computer system (server) is then typically operated and managed by the operator of the image analysis tools. The user is able to use the multitude of images from different end users for constant improvement of the algorithms for counting of the pests/beneficials and/or for identification of species and/or analysis of damage. The system is preferably configured such that the user of the second computer system can normally receive only images from the first computer system that come from imaging devices and/or plant analysis devices registered to that user.

In a preferred embodiment, a user having registered access to one or more devices (imaging devices and/or plant analysis devices) can permit users having registered access to other devices to access the images which to allow by the devices registered to that user.

A preferred embodiment of the present invention is thus a system comprising
 a first computer system for use by a first user,
 a second computer system for use by a second user,
 at least one first imaging device and at least one second imaging device in an area,
  wherein the first imaging device is registered to the first user,
  wherein the second imaging device is registered to the second user,
  wherein the first imaging device and the second imaging device each comprise
  a collecting region,
  an imaging unit,
  a transmitter unit, and
  a control unit,
  wherein the control unit of the first imaging device is configured to
   trigger the imaging unit of the first imaging device to generate images of the collecting region of the first imaging device, and trigger the transmitter unit to send the images and/or information regarding the images via a network to a third computer system, the third computer system which is connected via a network to the first computer system and to the second computer system, and which is configured to
receive the images and/or information regarding the images,
analyze the images and/or information received to obtain information regarding the pests and/or beneficials present in a sub-area,
transmit the information regarding the pests and/or beneficials present in the sub-area to the first user, wherein the first computer system is configured to
receive an enable command from the first user,
send an enable message to the third computer system in reaction to the enable command, wherein the third computer system is configured to
receive the enable command,
give the second user access to the images and/or information regarding the images in reaction to the enable command, such that the second user is able to call up the images and/or information regarding the images from the third computer system with the aid of the second computer system.

A preferred embodiment of the present invention is a method comprising:
setting up a first imaging device and a second imaging device in an area,
wherein the first imaging device is registered to a first user,
wherein the second imaging device is registered to a second user,
wherein the first imaging device comprises
a collecting region,
an imaging unit,
a transmitter unit, and
a control unit,
generating images of the collecting region of the first imaging device by means of the imaging unit of the first imaging device,
transmitting the images to a computer system via a network,
analyzing the images by means of the computer system and generating information regarding the pests and/or beneficials present in a sub-area,
transmitting the information regarding the pests and/or beneficials present in the sub-area to the first user,
receiving an enable instruction from the first user by means of the computer system,
transmitting the information regarding the pests and/or beneficials present in the sub-area to the second user.

In a preferred embodiment, the information transmitted to a computer system by various devices is analyzed to ascertain a direction of spread of (specific) pests/beneficials. It is conceivable, for example, that a pest species/beneficial species is first detected by a first imaging device and, at a later juncture, the same pest species/beneficial species is detected by a second imaging device. It can be concluded from this that the corresponding pest species/beneficial species is spreading from the first imaging device in the direction of the second imaging device. Given a multitude of imaging devices, it is possible to make more precise statements as to the direction of spread of the pest species/beneficial species.

A preferred embodiment of the present invention is thus a system comprising
a multitude of imaging devices in an area, wherein each imaging device comprises
a collecting region,
an imaging unit,
a transmitter unit, and
a control unit,
wherein the control unit is configured to
trigger the imaging unit to generate images of the collecting region, and
trigger the transmitter unit to send information relating to the images via a network to a computer system,
the computer system which is configured to
receive the information relating to the images from the multitude of imaging devices,
analyze the information received to obtain information regarding the amounts of a (specific) pest and/or (specific) beneficial present in the collecting regions of the multitude of imaging devices,
compare the amounts of the (specific) pest and/or (specific) beneficial present in the collecting regions of various imaging devices and find differences in the amounts,
use the differences in the amounts to calculate a direction of spread of the specific pest and/or specific beneficial, and
communicate the direction of spread to one or more users.

A preferred embodiment of the present invention a method comprising:
setting up a multitude of imaging devices in an area, wherein each imaging device comprises
a collecting region,
an imaging unit,
a transmitter unit, and
a control unit,
generating images of the collecting region of each imaging device,
transmitting information relating to the images to a computer system,
analyzing the information transmitted and generating information regarding the pests and/or beneficials present in a sub-area,
ascertaining differences in the amounts of the pests and/or beneficials present in the collecting regions of various imaging devices,
calculating a direction of spread of the pests and/or beneficials in the area or sub-area,
transmitting information regarding the direction of spread of the pests and/or beneficials to one or more users.

In a preferred embodiment, in addition, the speed of spread of pests/beneficials or a specific pest/beneficial is ascertained from the images of a multitude of imaging devices.

In a preferred embodiment, using the direction of spread ascertained and the speed of spread ascertained, it is possible to make a forecast that states when the pests/beneficials (or pest species/beneficial species) will reach further regions (fields, areas).

In a preferred embodiment, weather data (current weather, weather in the previous days, weather forecast for the next few days) are incorporated in the prediction of the direction of spread and the speed of spread.

Forecasts are typically created for a period of 1 to 20 days into the future, more preferably for a period of 1 to 10 days into the future.

In a preferred embodiment, in a field with the aid of one or more imaging devices, the arthropods present in the collecting region(s) are identified. In a next step, an analysis is made as to whether pests and their counterpart beneficials for which the pests identified serve as food or host are present among the arthropods identified. If such beneficials and/or pests are present, their numbers are determined. These numbers are compared in order to see whether the beneficials alone are capable of preventing uncontrolled reproduction and/or spread of the pests. The numbers are preferably expressed in relation to one another. The ratio of the number of pests to the number of their counterpart beneficials is compared to an empirically ascertained threshold. If the ratio is less than the threshold, there is no expectation of uncontrolled reproduction and/or spread of the pests. If the ratio is greater than the threshold, measures should be taken to avoid a loss of yield. The result of the comparison can be displayed to a user, preferably the farmer of the field in question. A measure for controlling the pests is preferably additionally recommended to the user. For the recommendation, the nomination of a crop protection product (for example an insecticide), the amount of crop protection product to be deployed, a favorable period for deployment of the crop protection product and the like may be indicated.

A preferred embodiment of the present invention is thus a system comprising
- at least one imaging device in an area, wherein the at least one imaging device comprises
  - a collecting region,
  - an imaging unit,
  - a transmitter unit, and
  - a control unit,
  - wherein the control unit is configured to
    - trigger the imaging unit to generate images of the collecting region, and
    - trigger the transmitter unit to send information relating to the images via a network to a computer system,
- the computer system which is configured to
  - receive the information relating to the images from the at least one imaging device,
  - analyze the information received to obtain information as to the amounts of (specific) pests and (specific) beneficials present in a sub-area,
  - calculate the ratio of the amount of the (specific) pests present in the sub-area to the amount of the (specific) beneficials present in the sub-area,
  - compare the ratio with a threshold and, if the ratio exceeds the threshold, transmit a message to one or more users that the ratio has been exceeded.

A further preferred embodiment of the present invention is a method comprising:
- setting up a multitude of imaging devices in an area, wherein each imaging device comprises
  - a collecting region,
  - an imaging unit,
  - a transmitter unit, and
  - a control unit,
- generating images of the collecting region of each imaging device,
- transmitting information relating to the images to a computer system,
- analyzing the information transmitted and generating information as to the (specific) pests and (specific) beneficials present in a sub-area,
- calculating the ratio of the amount of the (specific) pests present in the sub-area to the amount of the (specific) beneficials present in the sub-area,
- comparing the ratio with a threshold,
- if the ratio exceeds the threshold: transmitting a message to one or more users that the ratio has been exceeded.

In a further preferred embodiment, in a field with the aid of one or more imaging devices, the arthropods present in the collecting region(s) are identified. In a next step, an analysis is made as to whether pests and beneficials are present among the arthropods identified. If such beneficials and pests are present, their respective numbers can be determined. If a (specific) pest is present, it is possible, for example, by interrogating a database which stores control means for controlling the (specific) pests for a multitude of (specific) pests, to find one or more control means for controlling the (specific) pest present. If a (specific) beneficial is present, it is possible, for example, by interrogating a database which stores the effects of a multitude of control means on the (specific) beneficials for a multitude of (specific) beneficials, to ascertain the effects of the control means found for control of the (specific) pests present on the (specific) beneficials present. The control means found and the effects ascertained on the beneficials present may be displayed to a user. The user may then select, for example, a control means having minimal effects on the (specific) beneficials present.

It is also possible, for example using a model, to calculate what effects control of the pests, for example with an insecticide, could have on the beneficials. It is possible to calculate whether the adverse effects on the beneficials outweigh the positive effects of the control of the pests. If the adverse effects on the beneficials are predominant, it is possible to advise against control of pests and/or increase the interval.

A preferred embodiment of the present invention is thus a system comprising
- at least one imaging device in an area, wherein the at least one imaging device comprises
  - a collecting region,
  - an imaging unit,
  - a transmitter unit, and
  - a control unit,
  - wherein the control unit is configured to
    - trigger the imaging unit to generate images of the collecting region, and
    - trigger the transmitter unit to send information relating to the images via a network to a computer system,
- the computer system which is configured to
  - receive the information relating to the images from the at least one imaging device,
  - analyze the information received to obtain information as to the (specific) pests and (specific) beneficials present in a sub-area,
  - use the information as to the (specific) pests present in the sub-area to identify one or more control means for controlling the (specific) pests,
  - ascertain the effects of the one or more control means ascertained on the (specific) beneficials present in the sub-area,
  - transmit information regarding the one or more control means identified and regarding the effects of the one or more control means identified on the (specific) beneficials present in a sub-area to one or more users.

A preferred embodiment of the present invention is also a method comprising:
setting up a multitude of imaging devices in an area, wherein each imaging device comprises
a collecting region,
an imaging unit,
a transmitter unit, and
a control unit,
generating images of the collecting region of each imaging device,
transmitting information relating to the images to a computer system,
analyzing the information transmitted and generating information as to the (specific) pests and (specific) beneficials present in a sub-area,
identifying one or more control means for controlling the (specific) pests using the information as to the (specific) pests present in the sub-area,
ascertaining the effects of the one or more control means ascertained on the (specific) beneficials present in the sub-area,
transmitting information regarding the one or more control means identified and regarding the effects of the one or more control means identified on the (specific) beneficials present in the sub-area to one or more users.

In a preferred embodiment, the infestation density with a specific pest is ascertained for a sub-area. It is ascertained whether a damage threshold has been exceeded. In ascertaining whether the damage threshold has been exceeded, preference is given to taking account of information relating to plant status (health of the plants, stage of development, expected yield). In ascertaining whether the damage threshold has been exceeded, preference is given to taking account of information relating to beneficials present (species and number of beneficials present). The result is displayed to a farmer of the sub-area. If the damage threshold has been exceeded, measures that the farmer can take to reduce the expected damage are recommended.

A preferred embodiment of the present invention is thus a system comprising
at least one imaging device in an area, wherein the at least one imaging device comprises
a collecting region,
an imaging unit,
a transmitter unit, and
a control unit,
wherein the control unit of the imaging device is configured to
trigger the imaging unit to generate images of the collecting region, and
trigger the transmitter unit to send information relating to the images via a network to a computer system,
at least one plant analysis device in the area, wherein the at least one plant analysis device comprises
an imaging unit,
a transmitter unit, and
a control unit,
wherein the control unit of the plant analysis device is configured to
trigger the at least one imaging unit to generate images of one or more plants, and
trigger the transmitter unit to send information relating to the images via a network to a computer system,
the computer system which is configured to
receive the information relating to the images from the at least one imaging device,
analyze the information received from the at least one imaging device to obtain an infestation density in relation to one or more (specific) pests for a sub-area,
receive the information relating to the images from the at least one plant analysis device,
analyze the information received from the at least one plant analysis device to ascertain information as to the damage caused to the plants in the sub-area,
use the infestation density and the damage caused to the plants in the sub-area to ascertain whether a damage threshold has been exceeded,
if a damage threshold has been exceeded, transmitting information as to the damage threshold exceeded to one or more users.

A preferred embodiment of the present invention is also a method comprising:
setting up at least one imaging device and at least one plant analysis device in an area, wherein the imaging device comprises a collecting region,
generating first images of the collecting region by means of the imaging device,
generating second images of plants in the area by means of the plant analysis device,
transmitting the first images and/or information regarding the first images via a network to a computer system,
transmitting the second images and/or information regarding the second images via a network to the computer system,
analyzing the first images and/or the information regarding the first images and ascertaining an infestation density of (specific) pests in a sub-area,
analyzing the second images and/or the information regarding the second images and generating information as to the damage caused to the plants in the sub-area,
ascertaining from the infestation density and the damage caused to the plants in the sub-area as to whether a damage threshold has been exceeded,
if a damage threshold has been exceeded: transmitting information as to the damage threshold exceeded to one or more users.

In many sub-areas, green margins adjoining a field for crop plants are grown in order to increase biodiversity. It is conceivable that a farmer wishes to verify the effectiveness of the green margins and/or demonstrate it to an official body. In a preferred embodiment, therefore, by means of the imaging devices present in a sub-area, the number and species of the beneficials that occur in the sub-area or the number of one or more defined beneficial species is ascertained. The data ascertained are used to ascertain area densities for one or more beneficial species (number of beneficial species per hectare). The area densities are transmitted and displayed to the farmer of the sub-area and/or an official body.

A preferred embodiment of the present invention is thus a system comprising
at least one imaging device in an area, wherein the at least one imaging device comprises
a collecting region,
an imaging unit,
a transmitter unit, and a control unit,
wherein the control unit of the imaging device is configured to
trigger the imaging unit to generate images of the collecting region, and
trigger the transmitter unit to send information relating to the images via a network to a computer system,
the computer system which is configured to
receive the information relating to the images from the at least one imaging device,
analyze the information received from the at least one imaging device to obtain information as to the (specific) beneficials present in a sub-area,
transmit the information as to the (specific) beneficials present in the sub-area to one or more users.

A preferred embodiment of the present invention is also a method comprising:
setting up a multitude of imaging devices in an area, wherein each imaging device comprises
a collecting region,
an imaging unit,
a transmitter unit, and
a control unit,
generating images of the collecting region of each imaging device,
transmitting information relating to the images to a computer system,
analyzing the information transmitted and generating information as to the (specific) beneficials present in a sub-area,
transmitting the information as to the amounts of (specific) beneficials present in a sub-area to one or more users.

If (specific) pests are detected with the aid of the system of the invention comprising multiple imaging devices of the invention and the infestation density with one or more (specific) pests at the setup locations of multiple imaging devices has been exceeded, it is advisable for there to be concerted control of the (specific) pests. What is meant by "concerted" is that the control is effected in a balanced manner. Preference is given to applying one or more control means within the same (defined) period of time. Concerted control is much more effective and reduces the risk of formation of resistance to the control means used. Concerted control can be effected, for example, as follows: The infestation densities in relation to a (specific) pest are determined at various locations where imaging devices are positioned. If the damage thresholds in relation to one (specific) pest are exceeded at multiple locations, the users of the corresponding imaging devices at the multiple locations are identified. This can be done by interrogating a database. The users are then contacted, and they are given information as to the time at which they should deploy a (specific) control means against the (specific) pests and in what amount. Alternatively, the deployment can be effected by a service provider that deploys a control means at all those locations where the damage threshold has been exceeded. It is also conceivable to use drones or robots or autonomous agricultural machinery for deployment of the control means.

A preferred embodiment of the present invention is thus a system comprising
a multitude of imaging devices at different locations in an area, wherein the multitude of imaging devices is registered to different users,
wherein each imaging device comprises
a collecting region,
an imaging unit,
a transmitter unit, and
a control unit,
wherein the control unit of each imaging device is configured to
trigger the imaging unit to generate images of the collecting region, and
trigger the transmitter unit to send the images and/or information regarding the images via a network to a computer system,
the computer system which is configured to
receive the images and/or the information regarding the images,
analyze the images and/or the information regarding the images to obtain information as to the (specific) pests present at the different locations,
for each location among the different locations, calculate an infestation density in relation to a (specific) pest,
identify locations where a damage threshold in relation to the (specific) pest has been exceeded,
initiate a concerted application of a control means at all those locations where the damage threshold has been exceeded.

The application of a control means can be initiated in various ways:
identifying those users having registered access to a control means present at a location for which a damage threshold has been exceeded and transmitting a message to these users, wherein the message comprises a recommendation for a control means and a time and/or a period of time at which/in which the control means should be applied,
producing an application map, wherein the application map specifies sub-areas, wherein the sub-areas comprise locations where a damage threshold has been exceeded, wherein the application map comprises information as to the time at which/the period of time within which one or more control means against the (specific) pest should be applied within the sub-areas specified, and transmitting the application map to a service provider for deployment of control means or to a machine (drone, robot, agricultural machine) for deployment of control means.

A preferred process is accordingly characterized by the following:
setting up a multitude of imaging devices at different locations in an area, wherein the multitude of imaging devices is registered to different users,
wherein each imaging device comprises a collecting region, an imaging unit, a transmitter unit and a control unit,
producing images of the collecting regions at the different locations,
analyzing the images to obtain information as to the (specific) pests present at the various locations,
for each location among the different locations, calculating an infestation density in relation to a (specific) pest,
identifying the locations where a damage threshold in relation to the (specific) pest has been exceeded,
initiating a concerted application of a control means at all those locations where the damage threshold has been exceeded.

According to some embodiments, the present invention further provides a computer program product. The corresponding computer program has typically been installed on the end user's computer system, and permits remote infestation control.

In one embodiment of the present invention, the computer program is configured such that it provides the information delivered by the at least one device of the invention (directly or via an intermediate server) to the user. The computer program gives the user an overview of those devices assigned thereto. The assignment can be effected, for example, by virtue of each device having a unique identifier (e.g. an identification number) that the user inputs into the computer program manually using a keyboard or by speech command via a microphone or another input device. It is also conceivable that the identifier is present on the device as an optically readable code (for example as a barcode or matrix code (QR code, DataMatrix code or the like)) and can be read with a corresponding reader (barcode scanner, camera) and transferred into the computer program. Also conceivable is the use of an RFID tag or the transmission of an identifier from a permanent memory of the device by Bluetooth or near-field communication or via a W-LAN connection or the like.

The computer program can preferably be used to call up a geographic map recording the location of the devices assigned to a user. It is conceivable that this location is determined by means of a GPS sensor that may be part of the device. It is alternatively conceivable that the location is one assigned to the radio cell within which the device is present (for example the location of a base station).

By selection of a device (for example by input of identifying data or selection from a virtual menu or clicking on a location or the like), the user is able to call up information relating to the particular device. The user is able, for example, to call up the number of pests/beneficials present in the device at different times. The user is able to display the images generated at different times. The user is able to display the species recognized in an image. The user is able to display in an image which species have been recognized and which have not.

In a preferred embodiment, the computer program shows the user a forecast for the spread of one or more pest species. This is preferably displayed in the form of a geographic map in which there is color coding of the direction from which a pest species is spreading, the speed with which it is spreading and/or whether or not a damage threshold has been exceeded.

Further embodiments of the present invention are:
1. A system comprising:
    a multitude of imaging devices in an area, wherein each imaging device comprises
        a collecting region,
        an imaging unit,
        a transmitter unit and
        a control unit,
        wherein the control unit is configured to
            trigger the imaging unit to generate images of the collecting region, and
            trigger the transmitter unit to send information relating to the images via a network to a computer system,
    the computer system which is configured to
        receive the information relating to the images from the multitude of imaging devices,
        analyze the information received to obtain information regarding the pests and/or beneficials present in a sub-area,
        transmit the information regarding the pests and/or beneficials present in a sub-area to one or more users.
2. The system according to embodiment 1, wherein
    the control unit is configured to trigger the transmitter unit to send the images generated to the computer system,
    the computer system is configured to
        receive the images sent,
        analyze the images received from imaging devices in the sub-area to identify pests and/or beneficials and to calculate an area density for the sub-area for at least one pest species and/or at least one beneficial species,
        transmit the at least one area density calculated to a user.
3. The system according to embodiment 2, wherein
    the computer system is configured to
        analyze the images received from imaging devices in the sub-area to ascertain, for at least one pest species, whether a damage threshold has been exceeded, taking account of the number of beneficials for which the pest species serves as food source or host for the ascertaining of the information as to whether a damage threshold has been exceeded,
        transmit the information ascertained as to whether a damage threshold has been exceeded to the user.
4. The system according to embodiment 1, further comprising
    at least one plant analysis device in a sub-area, wherein the at least one plant analysis device comprises
        an imaging unit,
        a transmitter unit, and
        a control unit,
        wherein the control unit is configured to
            trigger the imaging unit to generate images of plants or plant parts that are being grown in the sub-area, and
            trigger the transmitter unit to send the images generated via a network to a computer system,
    the computer system which is configured to
        receive the images sent,
        analyze the images received to ascertain the state of development of the plants and/or the nature and/or severity of damage to the plants or plant parts by pests and/or the state of health of the plants,
        communicate the state of development of the plants and/or the nature and/or severity of damage to the plants or plant parts by pests and/or the state of health of the plants to a user.
5. The system according to embodiment 4, wherein
    the computer system is configured to
        receive the images sent by the imaging devices in the sub-area,
        analyze the images received to identify pests, wherein it is ascertained for at least one pest species whether a damage threshold has been exceeded by taking account of the development status of the plants and/or the nature and/or severity of damage to the plants or plant parts by pests and/or the state of health of the plants for the ascertaining of the information as to whether a damage threshold has been exceeded,
        transmit the information ascertained as to whether a damage threshold has been exceeded to the user.
6. The system according to embodiment 5, wherein
    the computer system is configured to
        receive the images sent by the imaging devices in the sub-area, analyze the images received to identify a number of beneficials, wherein at least one pest species serves as food source or host for the beneficials, by taking account of the number of beneficials for which the at least one pest species serves as food source or host for the ascertaining of the information as to whether a damage threshold has been exceeded, transmit the information ascertained as to whether a damage threshold has been exceeded to the user.

7. The system according to any of embodiments 1 to 6, wherein
the computer system is configured to
analyze the images received to ascertain a direction of spread of at least one pest species and a speed of spread of the at least one pest species,
communicate the direction of spread and the speed of spread to one or more users.

8. The system according to embodiment 7, wherein
the computer system is configured to
create a forecast for the spread of at least one pest species for a future period of time for one or more sub-areas,
transmit the forecast to one or more users.

9. The system according to embodiment 8, wherein the forecast incorporates weather data.

10. The system according to any of embodiments 1 to 9, wherein the imaging devices and/or the at least one plant analysis device comprise(s) a holder with which the imaging unit can be positioned at a defined distance above the ground, wherein the distance is variable.

11. The system according to any of embodiments 1 to 10, wherein the imaging devices comprise means of automated cleaning of the collecting region.

12. The system according to any of embodiments 1 to 11, wherein one or more imaging devices comprise a barrier that prevents soiling of the collecting region by plant parts.

13. A method comprising the steps of
setting up a multitude of imaging devices in an area, wherein each imaging device comprises
a collecting region,
an imaging unit,
a transmitter unit and
a control unit,
generating images of the collecting region of each imaging device,
transmitting information relating to the images to a computer system,
analyzing the information transmitted and generating information regarding the pests and/or beneficials present in a sub-area,
transmitting the information regarding the pests and/or beneficials present in a sub-area to one or more users.

14. A computer program product comprising a computer program which can be loaded into a memory of a computer, where it triggers the computer to execute the following steps:
receiving information from a multitude of imaging devices in an area, wherein the information from each imaging device relates to images that have been generated from a collecting region of the imaging device,
analyzing the information received and generating information regarding the pests and/or beneficials present in a sub-area,
transmitting the information regarding the pests and/or beneficials present in a sub-area to one or more users.

The invention is elucidated in detail hereinafter by figures and examples, without any intention to restrict the invention to the features and combinations of features specified in the figures and examples.

BRIEF DESCRIPTION OF THE DRAWINGS

The invention will now be described, by way of example only, with reference to the accompanying drawings, in which:

The figures show:

FIG. 4*a* shows the tablet in a side view; FIG. 4*b* shows the tablet in top view; FIG. 4*c* shows the tablet in a further side view;

FIG. 13(*a*) shows the vessel in a top view; FIG. 13(*b*) shows the vessel in a side view from the direction of point A (see FIG. 13(*a*)); FIG. 13(*c*) shows the vessel from the side in cross section along the dotted line A-B (see FIG. 13(*a*)).

DETAILED DESCRIPTION OF EXEMPLARY EMBODIMENTS

Figure 1:
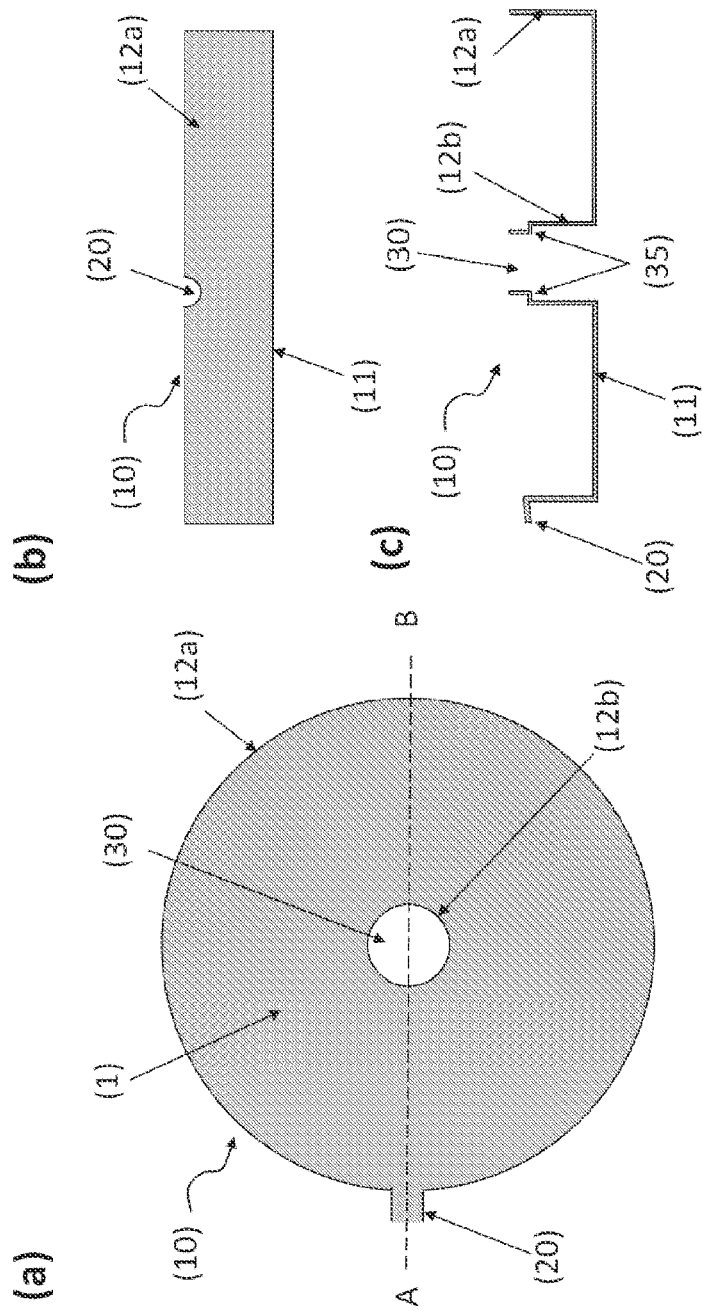
FIG. 1 shows a schematic of a vessel that provides a collecting region for pests and/or beneficials.

FIG. 1 shows a schematic of a vessel (10) that provides a collecting region (1) for pests and/or beneficials.

FIG. 1*a* shows the vessel (10) in a top view. FIG. 1*b* shows the vessel (10) in a side view from the direction of point A (see FIG. 1*a*). FIG. 1*c* shows the vessel (10) from the side in cross section along the dotted line A-B (see FIG. 1*a*).

The vessel (10) has a cylindrical shape with a round cross section. The cylinder is closed at the bottom by a base (11); it is open at the top. The base (11) and two concentric side walls (12*a*, 12*b*) that extend perpendicularly to the base (11) form a space to accommodate a liquid. The collecting region (1) is viewed from the top. A circular recess (30) delimited by the side wall (12*b*) is introduced into the middle of the vessel (10). The recess narrows in the upward direction, forming a ring (35) that can serve as contact surface for a holder (see FIG. 2).

A semicircular recess in the side wall (12*a*) has been introduced at the side, at which a channel (20) points outward. Rainwater that gets into the vessel (10) can flow away via this channel.

Figure 2:
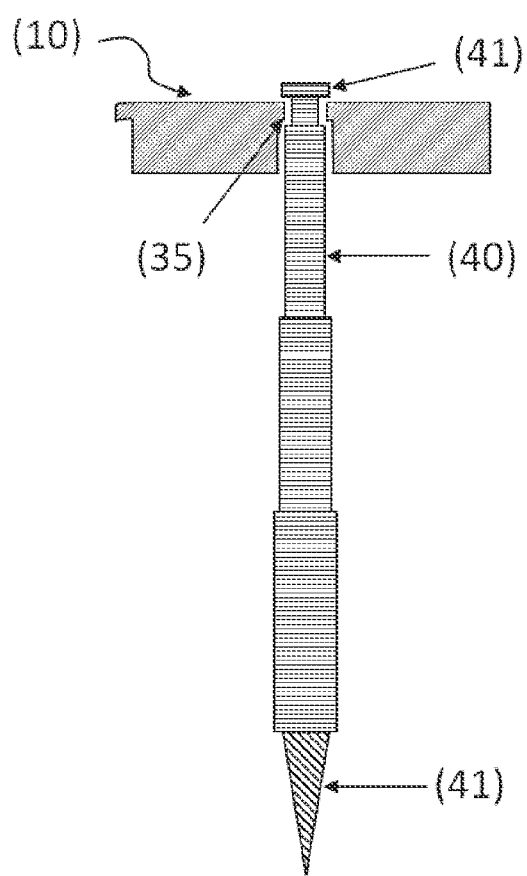
FIG. 2 shows the vessel illustrated in FIG. 1 together with a telescopic rod on which the vessel is secured, in cross section.

FIG. 2 shows the vessel (10) illustrated in FIG. 1 together with a telescopic rod (40) on which the vessel is secured, in cross section. With the aid of the telescopic rod, it is possible to vary the distance between the collecting region (1) and the ground. The vessel rests on the telescopic rod (41) by the ring (35). The telescopic rod (41) has an internal thread (not shown in the figure) in the upper region, into which a screw (41) that locks the vessel (10) and the telescopic rod (40) to one another has been screwed. In the lower region, the telescopic rod (40) has a tip (41) that can be driven into a soil. It is conceivable to provide other devices for setup of the vessel (10), for example a screw thread for drilling into the soil or a tripod. Further options are conceivable.

Figure 3:
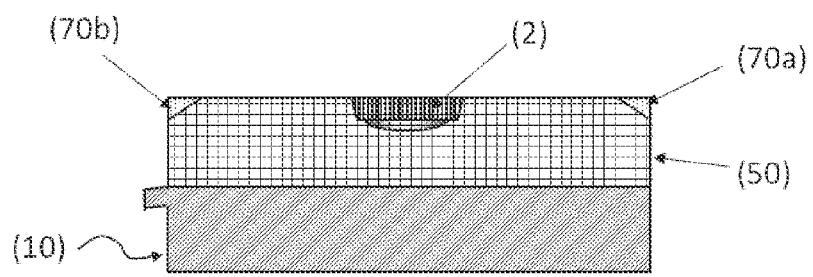
FIG. 3 shows the vessel illustrated in FIG. 1*b*, over which a cage has been mounted.

FIG. 3 shows the vessel (10) illustrated in FIG. 1*b*, over which a cage (50) has been mounted. The dimensions of the grid spacing here are such that no leaves get into the vessel. The imaging unit (2) is mounted at the top of the grid (50). It is within the cage. Two lighting units (70*a*, 70*b*) ensure defined illumination of the collecting region.

Figure 4:
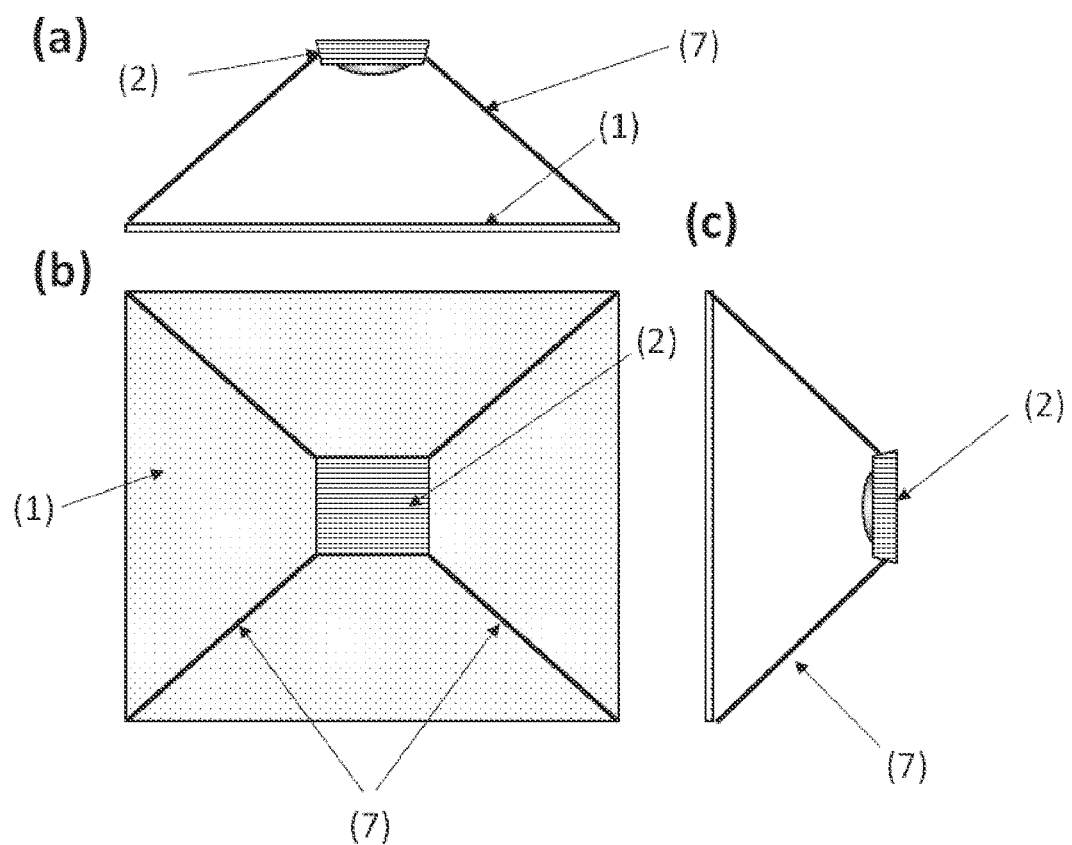
FIG. 4 shows a schematic of a tablet that provides a collecting region.

FIG. 4 shows a schematic of a tablet that provides a collecting region (10). FIG. 4*a* shows the tablet in a side view. FIG. 4*b* shows the tablet in top view. FIG. 4*c* shows the tablet in a further side view. On the card are mounted holding bars (7), at the end of which is secured an imaging unit.

Figure 5:
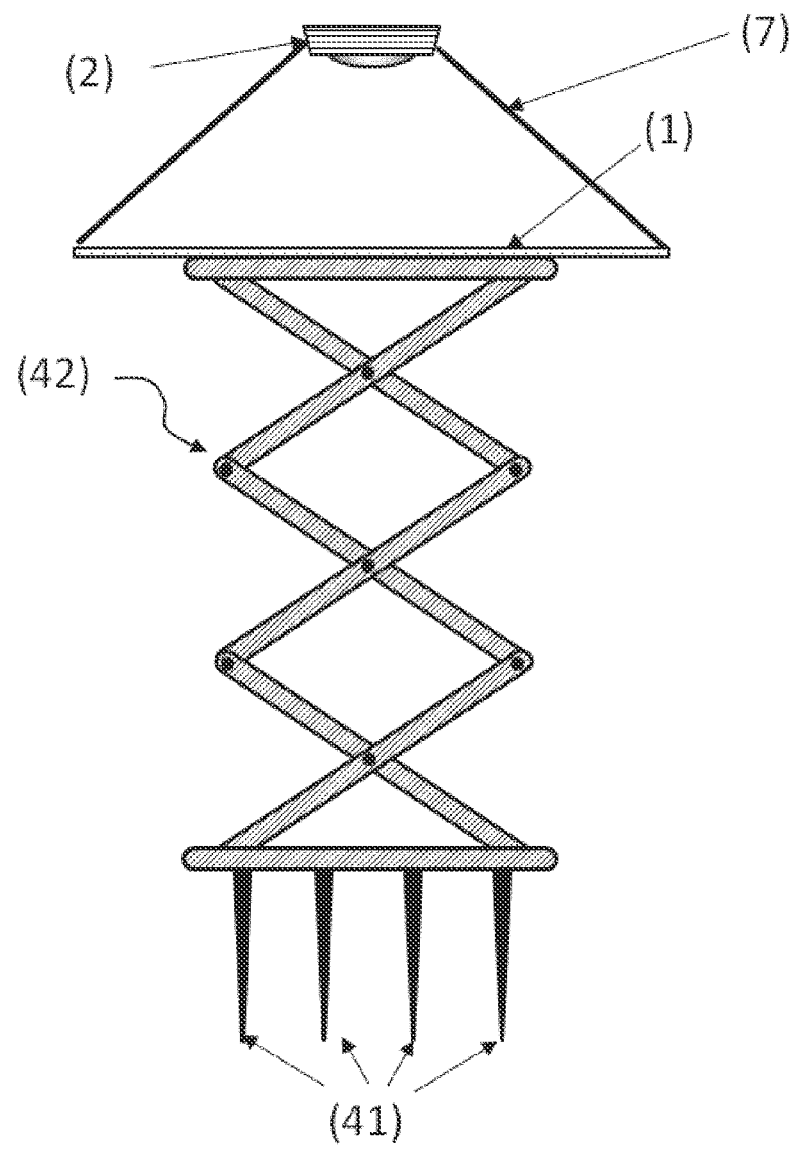
FIG. 5 shows the tablet illustrated in FIG. 4*a*, mounted on a lifting platform.

FIG. 5 shows the tablet illustrated in FIG. 4*a*, mounted on a lifting platform (42). The lifting platform (42) has, in the lower region, tips (41) with which the lifting platform can be secured in a soil.

Figure 6:
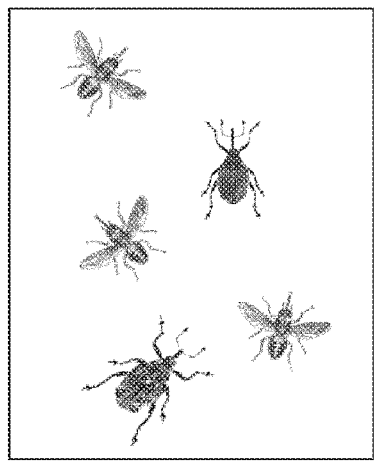
FIG. 6 shows a schematic of one embodiment of the imaging device (A) of the invention.
Figure 6:
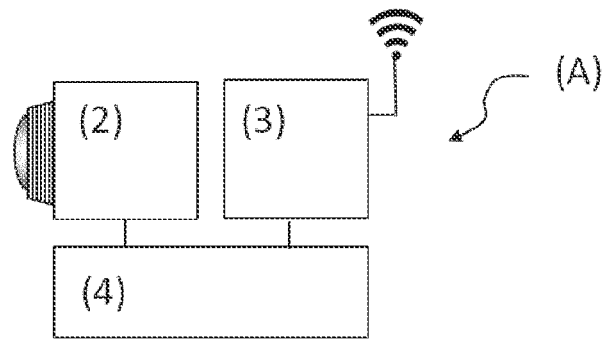

FIG. 6 shows a schematic of one embodiment of the imaging device (A) of the invention. The imaging device (A) comprises a collecting region (1), an imaging unit (2), a transmitter unit (3) and a control unit (4).

Figure 7:
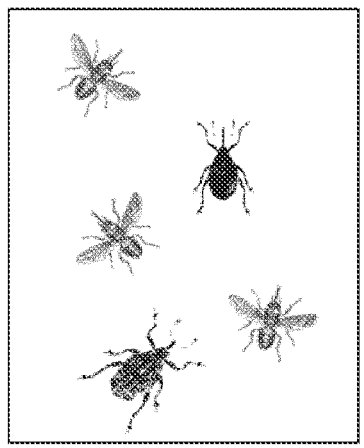
FIG. 7 shows a schematic of a further embodiment of the imaging device (A) of the invention.
Figure 7:
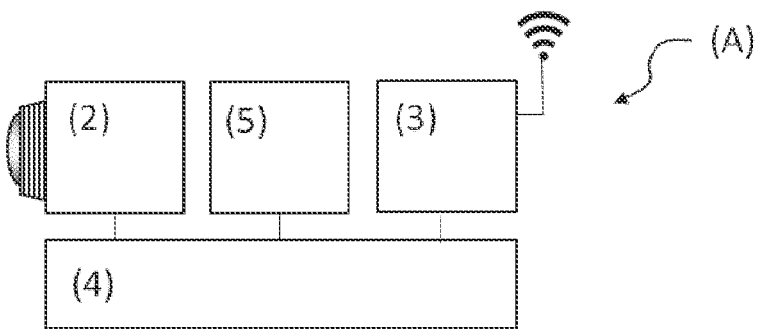

FIG. 7 shows a schematic of a further embodiment of the imaging device (A) of the invention. The imaging device (A) comprises a collecting region (1), an imaging unit (2), a transmitter unit (3), a control unit (4) and an evaluation unit (5).

Figure 8:
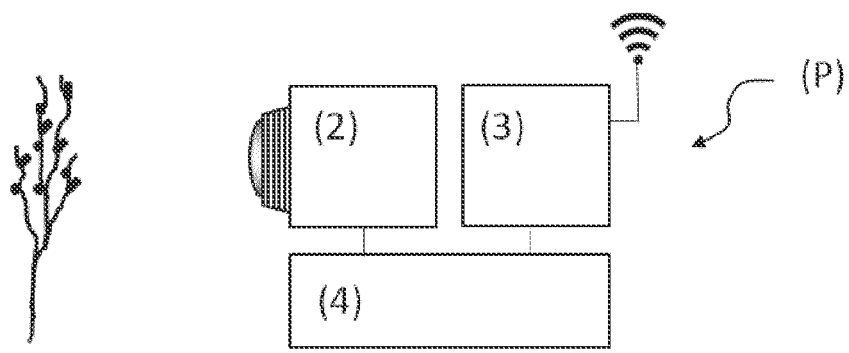
FIG. 8 shows a schematic of one embodiment of the plant analysis device (P) of the invention.

FIG. 8 shows a schematic of one embodiment of the plant analysis device (P) of the invention. The plant analysis device (A) comprises an imaging unit (2), a transmitter unit (3) and a control unit (4).

Figure 9:
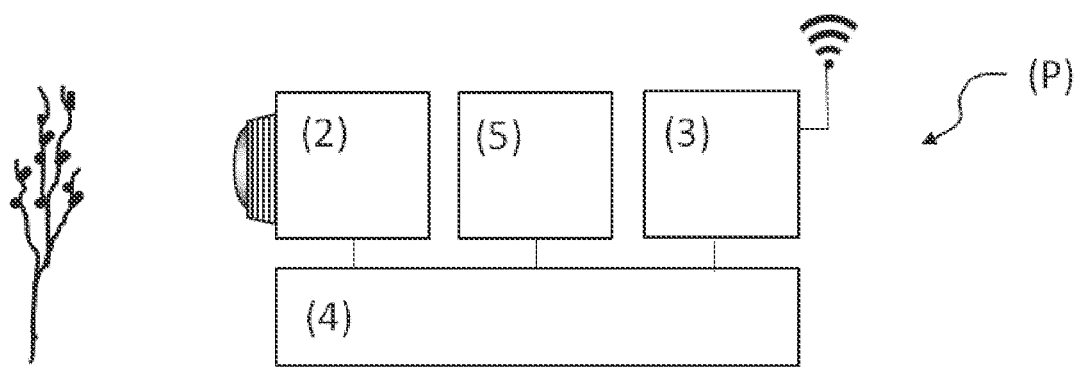
FIG. 9 shows a schematic of a further embodiment of the plant analysis device (P) of the invention.

FIG. 9 shows a schematic of a further embodiment of the plant analysis device (P) of the invention. The plant analysis device (A) comprises an imaging unit (2), a transmitter unit (3), a control unit (4) and an evaluation unit (5).

Figure 10:
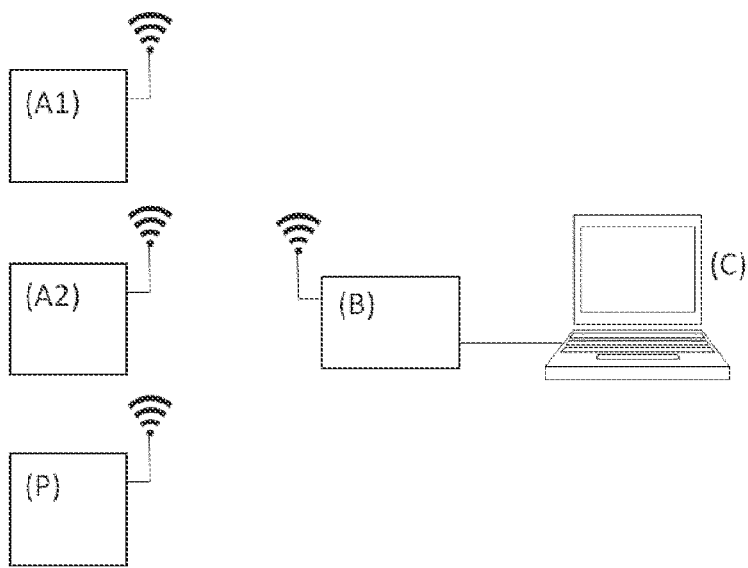
FIG. 10 shows schematically one embodiment of the system according to the invention.

FIG. 10 shows schematically one embodiment of the system according to the invention. The system comprises a multitude of devices (A1, A2, P) that generate images. Information relating to the images is transmitted via a radio network to a base station (B). They are transmitted from there via a network to a computer system (C).

Figure 11:
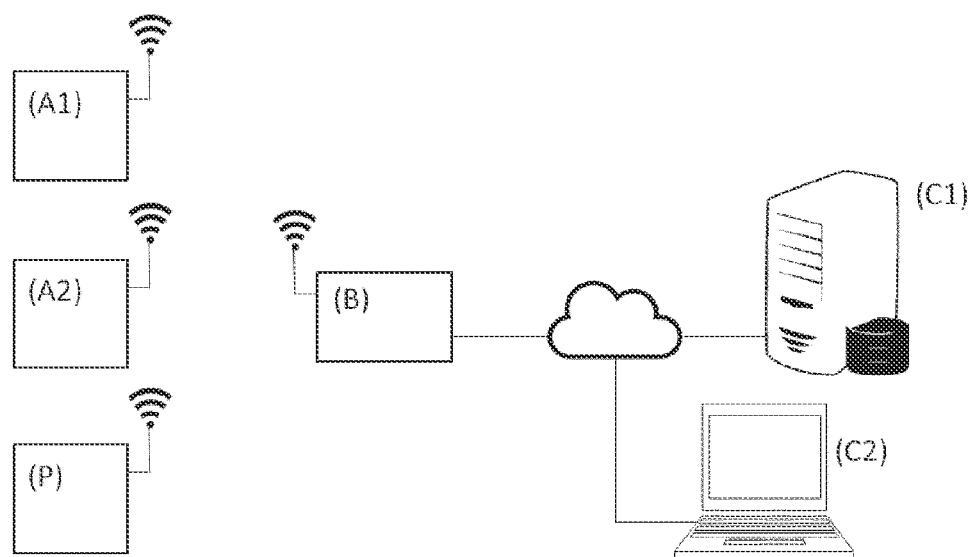
FIG. 11 shows schematically a further embodiment of the system according to the invention.

FIG. 11 shows schematically a further embodiment of the system according to the invention. The system comprises a multitude of devices (A1, A2, P) that generate images. Information relating to the images is transmitted via a radio network to a base station (B). The information is transmitted from there via a network (represented by the cloud) to a computer system (C1). Information relating to the images can be called up from the computer system (C1) by means of the computer system (C2).

Figure 12:
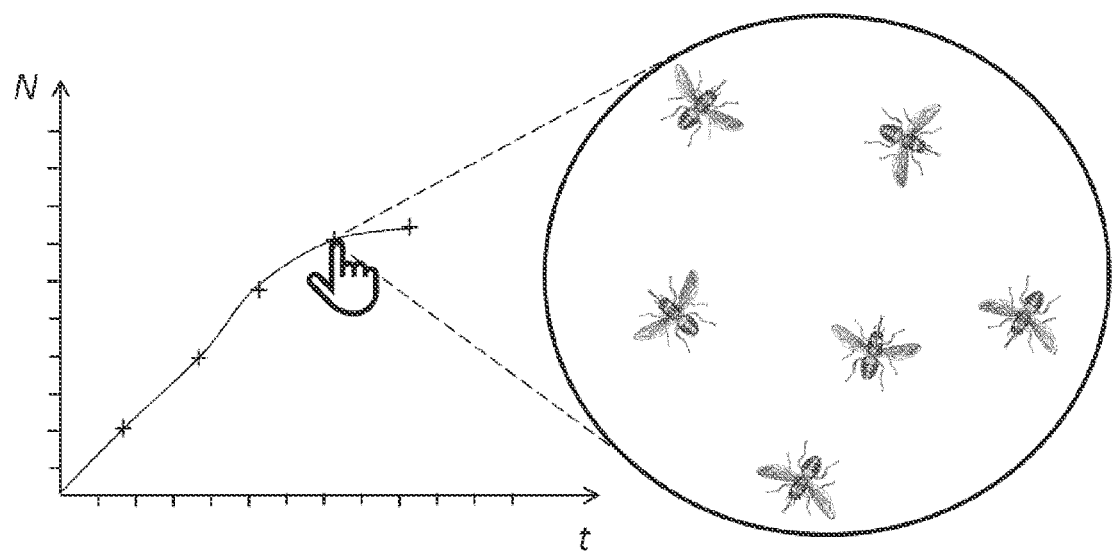
FIG. 12 shows a schematic illustration of the computer program of the invention according to some embodiments.

FIG. 12 shows a schematic illustration of the computer program of the invention. The number N of species counted in an automated manner in images at a defined time t is shown as a graph. By clicking on a data point, the corresponding image is displayed.

Figure 13:
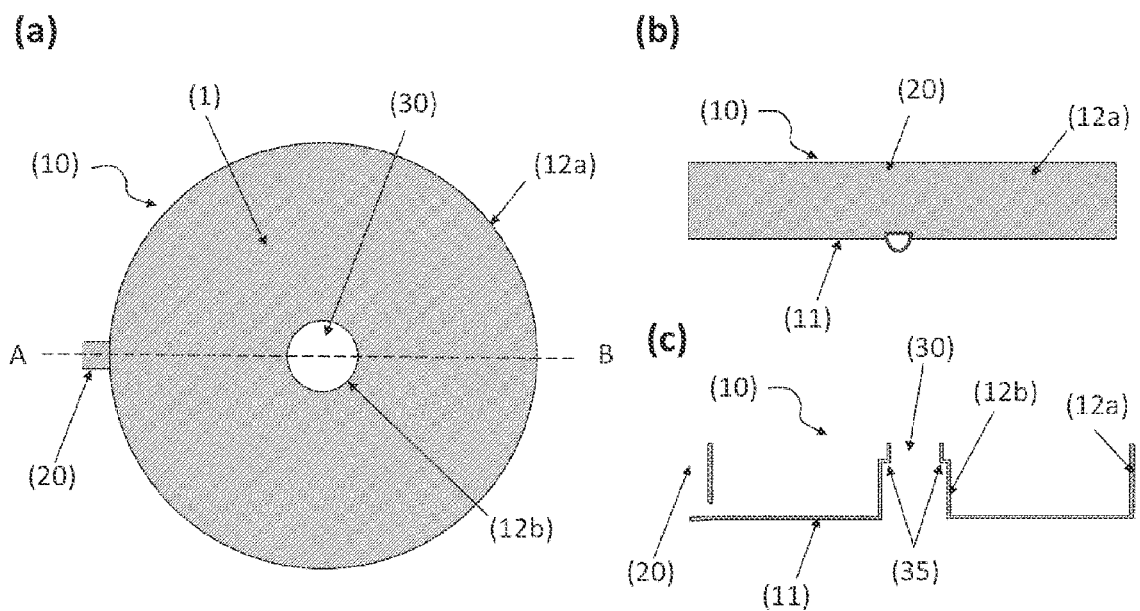
FIG. 13 shows a schematic of a vessel that provides a collecting region for pests and/or beneficials.

FIG. 13 shows a schematic of a vessel (10) that provides a collecting region (1) for pests and/or beneficials. FIG. 13(*a*) shows the vessel (10) in a top view. FIG. 13(*b*) shows the vessel (10) in a side view from the direction of point A (see FIG. 13(*a*)). FIG. 13(*c*) shows the vessel (10) from the side in cross section along the dotted line A-B (see FIG. 13(*a*)). The vessel (10) has a cylindrical shape with a round cross section. The cylinder is closed at the bottom by a base (11); it is open at the top. The base (11) and two concentric side walls (12*a*, 12*b*) that extend perpendicularly to the base (11) form a space. The collecting region (1) is viewed from the top. A circular recess (30) delimited by the side wall (12*b*) is introduced into the middle of the vessel (10). The recess narrows in the upward direction, forming a ring (35) that can serve as contact surface for a holder. A semicircular recess is introduced into the side wall (12*a*) of the vessel (10) at one point, at which a channel (20) points outward. rainwater that gets into the vessel (10) can flow away via this channel.

The invention claimed is:

1. An imaging device comprising:
    a collecting region,
    an imaging unit,
    a transmitter unit;
    a receiver unit; and
    a control unit,
    wherein the control unit is configured to:
        trigger the imaging unit to generate images of the collecting region, and
        trigger the transmitter unit to send the images generated and/or information regarding the images generated via a network to a computer system;
    wherein the receiver unit is configured to receive a message from the computer system when the computer system determines that a number or amount of pests and/or beneficials in a sub-area of an area in which the imaging device is positioned changes in a predefined manner; and
    wherein the control unit is configured to adjust times at which and/or frequency in which the images are generated and/or at/in which the images and/or information regarding the images are sent to the computer system via the network based on the message received from the computer system.

2. The imaging device of claim 1, wherein the collecting region is not configured for immobilizing and/or collecting arthropods.

3. The imaging device of claim 1, wherein the collecting region is formed by a surface having at least one opening through which rainwater can drain from the collecting region.

4. The imaging device of claim 3, wherein an outflow channel via which the rainwater can flow away in a directed manner adjoins the at least one opening.

5. The imaging device of claim 1, located in an area where the collecting region is formed by a flat surface having an inclination ranging from 5° to 80° relative to horizontal.

6. The imaging device of claim 1, further comprising an automated cleaning unit of the collecting region.

7. The imaging device of claim 1, further comprising a holder with which the imaging device can be positioned at a defined distance above soil, wherein the distance can be varied.

8. The imaging device of claim 7, further comprising a height adjustment unit configured such that it sets a height of the collecting region above the soil to a defined value in an automated manner.

9. The imaging device of claim 1, wherein the collecting region is separated from an environment by a mesh or grid.

10. The imaging device of claim 1, further comprising at least one light source, wherein the at least one light source is directed onto the collecting region such that electromagnetic radiation hits the collecting region and at least a portion of the electromagnetic radiation is scattered from the collecting region in a direction of the imaging unit.

11. The imaging device of claim 1, further comprising at least a presence sensor,
wherein the presence sensor is configured to:
detect a physical property in its environment that correlates with a probability of presence of an arthropod in the collecting region, and
convert the property detected into a signal; and
wherein the control unit is configured to:
fix times at which and/or frequency in which the images are generated and/or at/in which the images and/or information regarding the images are sent to the computer system via the network, on the basis of the signal from the presence sensor.

12. A system comprising:
a plurality of imaging devices in an area, wherein each imaging device comprises:
a collecting region,
an imaging unit,
a transmitter unit,
a receiver unit, and
a control unit configured to trigger the imaging unit to generate images of the collecting region and to trigger the transmitter unit to send information relating to the images via a network, and
a computer system configured to:
receive the information relating to the images transmitted via the network from the plurality of imaging devices,
analyze the information received to obtain information regarding the pests and/or beneficials present in a sub-area,
transmit the information regarding the pests and/or beneficials present in a sub-area to one or more users, and
transmit a message to one or more of the plurality of imaging devices when a number or amount of pests and/or beneficials in the sub-area changes in a predefined manner;
wherein the receiver unit of each imaging device is configured to receive a message transmitted to the imaging device, and
wherein the control unit of each imaging device is configured to adjust times at which and/or frequency in which the images are generated and/or at/in which the images and/or information regarding the images are sent to the computer system via the network based on the message.

13. The system of claim 12, further comprising at least one plant analysis device in the sub-area, wherein the at least one plant analysis device comprises an imaging unit, a transmitter unit and a control unit,
wherein the control unit is configured to:
trigger the imaging unit to generate images of plants or plant parts that are being grown in the sub-area, and
trigger the transmitter unit to send the images generated via a network to a computer system,
wherein the computer system which is configured to:
receive the images sent,
analyze the images received to ascertain a state of development of the plants and/or nature and/or severity of damage to the plants or plant parts by pests and/or state of health of the plants, and
communicate the state of development of the plants and/or the nature and/or severity of damage to the plants or plant parts by pests and/or the state of health of the plants to the one or more users.

14. The system of claim 12, comprising:
at least one base station,
wherein the control unit of a first imaging device of the plurality of imaging devices in the area is configured to:
trigger the imaging unit of the first imaging device to generate first images of the collecting region of the first imaging device, and
trigger the transmitter unit of the first imaging device to transmit the first images and/or information regarding the first images via a short-range radio link to a second imaging device of the plurality of imaging devices in the area,
wherein the control unit of the second imaging device is configured to:
trigger the receiving unit of the second imaging device to receive the first images,
trigger the imaging unit of the second imaging device to generate second images of the collecting region of the second imaging device, and
trigger the transmitter unit of the second imaging device to transmit the first images and the second images and/or information regarding the first images and the second images via a short-range radio link to the base station,
wherein the base station is configured to:
receive the first images and the second images and transfer them via a long-range radio link to the computer system,
wherein the computer system is configured to:
receive the first images and the second images transferred by the base station,
analyze the first images and the second images to obtain information regarding the pests and/or beneficials present in the area, and
transmit the information regarding the pests and/or beneficials present in the area to the one or more users.

15. The system of claim 12, wherein the computer system comprises:
a first computer system for use by a first user,
a second computer system for use by a second user, and
a third computer system connected to the first and second computer systems via a second network;
wherein the plurality of imaging devices in the area comprises at least a first imaging device and a second imaging device in the area, wherein:
the first imaging device is registered to the first user, and
the second imaging device is registered to the second user,
wherein the third computer system is configured to:
receive images and/or information regarding the images of the collecting region of the first imaging device generated by the imaging unit of the first imaging device and transmitted via the network by the transmitter unit of the first device, analyze the images and/or information regarding the images of the collecting region of the first imaging device to obtain information regarding the pests and/or beneficials present in the sub-area, and transmit the information regarding the pests and/or beneficials present in the sub-area to the first user, wherein the first computer system is configured to:

receive an enable command from the first user, send an enable message to the third computer system in reaction to the enable command, wherein the third computer system is configured to:

receive the enable command, and give the second user access to the images and/or information regarding the images in reaction to the enable command, such that the second user is able to call up the images and/or information regarding the images from the third computer system with aid of the second computer system.

16. The system of claim 12, wherein the computer system is configured to:

analyze the information received to obtain information regarding amounts of a (specific) pest and/or (specific) beneficial present in the collecting regions of the plurality of imaging devices, compare the amounts of the (specific) pest and/or (specific) beneficial present in the collecting regions of various imaging devices and find differences in the amounts, use the differences in the amounts to calculate a direction of spread of the specific pest and/or specific beneficial, and communicate the direction of spread to the one or more users.

17. The system of claim 12, wherein the computer system which is configured to:

receive the information relating to the images from the at least one imaging device, analyze the information received to obtain information as to amounts of (specific) pests and (specific) beneficials present in the sub-area, calculate a ratio of the amount of the (specific) pests present in the sub-area to the amount of the (specific) beneficials present in the sub-area, and compare the ratio with a threshold and, if the ratio exceeds the threshold, transmit a message to the one or more users that the ratio has been exceeded.

18. The system of claim 12, wherein the computer system is configured to:

receive the information relating to the images from the at least one imaging device, analyze the information received to obtain information as to the (specific) pests and (specific) beneficials present in a sub-area, use the information as to the (specific) pests present in the sub-area to identify one or more control measures for controlling the (specific) pests, ascertain effects of the one or more control measures ascertained on the (specific) beneficials present in the sub-area, and transmit information regarding the one or more control measures identified and regarding the effects of the one or more control measures identified on the (specific) beneficials present in the sub-area to the one or more users.

19. The system of claim 12, comprising:

at least one plant analysis device in the area, wherein the at least one plant analysis device comprises:

an imaging unit, a transmitter unit, and a control unit configured to trigger the imaging unit of the plant analysis device to generate images of one or more plants and to trigger the transmitter unit of the plant analysis device to send information relating to the images via the network to the computer system;

wherein the computer system is configured to:

receive the information relating to the images from the at least one imaging device, analyze the information received from the at least one imaging device to obtain an infestation density in relation to one or more (specific) pests for a sub-area, receive the information relating to the images from the at least one plant analysis device, analyze the information received from the at least one plant analysis device to ascertain information as to the damage caused to the plants in the sub-area, use the infestation density and the damage caused to the plants in the sub-area to ascertain whether a damage threshold has been exceeded, and if a damage threshold has been exceeded, transmit information as to the damage threshold exceeded to one or more users.

20. The system of claim 12, wherein a each of the plurality of imaging devices is positioned at a different location in the area, wherein each of the plurality of imaging devices is registered to different users, wherein the computer system which is configured to:

receive the images and/or the information regarding the images from the plurality of imaging devices, analyze the images and/or the information regarding the images to obtain information as to the (specific) pests present at the different locations, for each location among the different locations, calculate an infestation density in relation to a (specific) pest, identify locations where a damage threshold in relation to the (specific) pest has been exceeded, and initiate a concerted application of a control measure at all those locations where the damage threshold has been exceeded.

21. A method comprising:

setting up a plurality of imaging devices in an area, wherein each imaging device comprises:

a collecting region, an imaging unit, a transmitter unit, and a control unit;

generating images of the collecting region of each imaging device, transmitting information relating to the images to a computer system, analyzing the information transmitted and generating information regarding the pests and/or beneficials present in a sub-area, transmitting information regarding the pests and/or beneficials present in a sub-area to one or more users, identifying a change in an amount of one or more pests and/or beneficials over time in the sub-area, transmitting information regarding the change over time to one or more imaging devices, and adjusting times at which and/or frequency in which images are generated and/or at/in which images and/or information regarding the images are sent to the computer system via a network to the change over time.

22. The method of claim 21, comprising:
ascertaining differences in amounts of the pests and/or beneficials present in the collecting regions of various imaging devices,
calculating a direction of spread of the pests and/or beneficials in the area or sub-area, and
transmitting information regarding the direction of spread of the pests and/or beneficials to the one or more users.

23. The method of claim 21, comprising:
analyzing the information transmitted and generating information as to the (specific) pests and (specific) beneficials present in a sub-area,
calculating a ratio of an amount of the (specific) pests present in the sub-area to the amount of the (specific) beneficials present in the sub-area,
comparing the ratio with a threshold, and
if the ratio exceeds the threshold: transmitting a message to the one or more users that the ratio has been exceeded.

24. The method of claim 23, comprising:
identifying one or more control measures for controlling the (specific) pests using the information as to the (specific) pests present in the sub-area,
ascertaining effects of the one or more control measures ascertained on the (specific) beneficials present in the sub-area, and
transmitting information regarding the one or more control measures identified and regarding the effects of the one or more control measures identified on the (specific) beneficials present in the sub-area to the one or more users.

25. A non-transitory computer readable storage medium storing one or more programs, the one or more programs comprising instructions which when executed by an electronic device, cause the device to:
receive information from a plurality of imaging devices in an area, wherein each imaging device comprises:
a collecting region,
an imaging unit,
a transmitter unit,
a receiver unit, and
a control unit configured to trigger the imaging unit to generate images of the collecting region and to trigger the transmitter unit to send information relating to the images via a network;
wherein the information from each imaging device relates to images that have been generated from a collecting region of the imaging device,
analyze the information received and generate information regarding the pests and/or beneficials present in a sub-area, and
transmit the information regarding the pests and/or beneficials present in the sub-area to the one or more users,
transmit a message to one or more of the plurality of imaging devices when a number or amount of pests and/or beneficials in the sub-area changes in a predefined manner;
wherein the receiver unit of each imaging device is configured to receive a message transmitted to the imaging device, and
wherein the control unit of each imaging device is configured to adjust times at which and/or frequency in which the images are generated and/or at/in which the images and/or information regarding the images are sent to the computer system via the network based on the message.

* * * * *